(12) United States Patent
Maruyama et al.

(10) Patent No.: US 10,914,259 B2
(45) Date of Patent: Feb. 9, 2021

(54) CONTROL DEVICE FOR PRE-MIXTURE COMPRESSION IGNITION ENGINE

(71) Applicant: Mazda Motor Corporation, Hiroshima (JP)

(72) Inventors: Keiji Maruyama, Aki-gun (JP);
Takuya Ohura, Aki-gun (JP);
Masanari Sueoka, Aki-gun (JP);
Tatsuhiro Tokunaga, Aki-gun (JP);
Toru Miyamoto, Aki-gun (JP);
Tomohiro Nishida, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/775,589

(22) Filed: Jan. 29, 2020

(65) Prior Publication Data
US 2020/0332735 A1 Oct. 22, 2020

(30) Foreign Application Priority Data

Apr. 19, 2019 (JP) ................................ 2019-080367

(51) Int. Cl.
*F02D 41/06* (2006.01)
*F02B 9/02* (2006.01)
(Continued)

(52) U.S. Cl.
CPC .............. *F02D 41/068* (2013.01); *F02B 9/02* (2013.01); *F02D 9/04* (2013.01); *F02D 9/08* (2013.01);
(Continued)

(58) Field of Classification Search
CPC ........ F02D 41/068; F02D 9/04; F02D 41/402; F02D 41/0002; F02D 13/0215;
(Continued)

(56) References Cited

U.S. PATENT DOCUMENTS 4,005,693 A * 2/1977 Masaki ..................... F01P 5/00
123/406.55
10,094,301 B2 * 10/2018 Omura ..................... F02D 9/04
(Continued)

FOREIGN PATENT DOCUMENTS

JP 2018084183 A 5/2018

*Primary Examiner* — Xiao En Mo
(74) *Attorney, Agent, or Firm* — Alleman Hall Creasman & Tuttle LLP

(57) ABSTRACT

A control device is provided for an engine in which pre-mixed compression ignition combustion is carried out. The device includes an air amount adjusting mechanism, a variable valve mechanism, an exhaust choke valve, a water temperature sensor, and a processor. The processor controls the variable valve mechanism so that a valve overlap period of a given amount or more is formed in a low-load range where the engine load is low, and controls an injector, the air amount adjusting mechanism, and the exhaust choke valve so that A/F lean mixture gas is formed inside a combustion chamber, and premixed compression ignition combustion of the mixture gas is carried out. During the operation in the low-load range, the combustion controlling module makes an opening of the exhaust choke valve when a temperature parameter is low, smaller than that when the temperature parameter is high.

11 Claims, 10 Drawing Sheets

(51) Int. Cl.
  *F02D 9/04* (2006.01)
  *F02D 9/08* (2006.01)
  *F02D 13/02* (2006.01)
  *F02D 41/00* (2006.01)
  *F02D 41/40* (2006.01)
  *F02M 61/14* (2006.01)

(52) U.S. Cl.
  CPC ..... *F02D 13/0215* (2013.01); *F02D 41/0002* (2013.01); *F02D 41/401* (2013.01); *F02D 41/402* (2013.01); *F02M 61/14* (2013.01); *F02D 2200/021* (2013.01)

(58) Field of Classification Search
  CPC .... F02D 9/08; F02D 41/401; F02D 2200/021; F02B 9/02; F02M 61/14
  See application file for complete search history.

(56) References Cited

U.S. PATENT DOCUMENTS

| | | | |
|---|---|---|---|
| 2011/0067679 A1* | 3/2011 | Hitomi | F02D 41/402 123/564 |
| 2011/0276255 A1* | 11/2011 | Haskara | F02D 41/402 701/105 |
| 2015/0121847 A1* | 5/2015 | Pursifull | F02D 41/0077 60/274 |
| 2015/0315986 A1* | 11/2015 | Minami | F02D 19/105 60/274 |
| 2018/0017001 A1* | 1/2018 | Ito | F02D 41/0055 |
| 2018/0066561 A1* | 3/2018 | Nakada | F01N 3/36 |
| 2018/0266365 A1* | 9/2018 | Aoyagi | F02M 26/40 |
| 2019/0107040 A1 | 4/2019 | Tsumura | |

* cited by examiner

CONTROL DEVICE FOR PRE-MIXTURE COMPRESSION IGNITION ENGINE

TECHNICAL FIELD

The present disclosure relates to a device for controlling an engine, which is capable of performing premixed compression ignition combustion in which fuel injected into a combustion chamber is combusted by self-ignition, while being mixed with air.

BACKGROUND OF THE DISCLOSURE

In recent years, premixed compression ignition combustion (Homogeneous-Charged Compression Ignition (HCCI) combustion) in which gasoline fuel mixed with air is combusted inside a combustion chamber by self-ignition has attracted attention. Since the premixed compression ignition combustion is a mode in which a mixture gas combusts at a plurality of positions simultaneously, it is said that the combusting rate of the mixture gas is fast, and it is very advantageous with respect to fuel efficiency (thermal efficiency), compared with SI combustion (jump-spark ignition combustion) adopted in normal gasoline engines.

As one type of premixed compression ignition combustion, a combustion mode is proposed in which combustion by self-ignition of the mixture gas and forcible combustion using an ignition plug are combined. That is, a portion of the mixture gas is forcibly combusted by flame propagation which is triggered by a jump-spark ignition (SI combustion), and the remaining mixture gas is combusted by the self-ignition (CI combustion). Below, such combustion is referred to as partial compression ignition combustion.

As one example of the engine which adopts the partial compression ignition combustion, JP2018-084183A is known as follows. In detail, in the engine disclosed in JP2018-084183A, an exhaust gas recirculation (EGR) rate inside a combustion chamber, a timing of the jump-spark ignition by the ignition plug, etc. are controlled, during an execution of the partial compression ignition combustion (in this document, it is referred to as "SI-CI combustion"), so that a SI ratio which is a ratio of an amount of heat release caused by SI combustion to the total amount of heat release in one cycle becomes in agreement with a target value (target SI ratio) determined according to the engine load (target torque).

Here, in the engine disclosed in JP2018-084183A, an air-fuel ratio (A/F) inside the combustion chamber is set near a stoichiometric air-fuel ratio (14.7:1) in an operating range where the partial compression ignition combustion is performed. Here, if the air-fuel ratio during the partial compression ignition combustion can be made sufficiently greater than the stoichiometric air-fuel ratio (leaner), it is thought that the engine becomes further advantageous in respect of fuel efficiency. However, since the ignitability of the mixture gas declines under the environment where the air-fuel ratio is greater than the stoichiometric air-fuel ratio (A/F lean environment), there is a problem of the stability of the partial compression ignition combustion being difficult to secure.

SUMMARY OF THE DISCLOSURE

The present disclosure is made in view of the situations, and one purpose thereof is to provide a control device for a premixed compression ignition engine capable of achieving both an improvement in fuel efficiency by making an air-fuel ratio leaner, and securing combustion stability.

In order to solve the above problem, the present inventors conducted an experiment in which partial compression ignition combustion of a mixture gas of an air-fuel ratio sufficiently greater than a stoichiometric air fuel ratio (lean) is carried out under various temperature conditions with different stages of warm-up. In particular, in a situation of an insufficient warm-up (semi-warm-up), the inventors observed that, by reducing an opening of an exhaust choke valve provided to an exhaust passage, a ratio of exhaust gas which remains inside a combustion chamber (internal EGR rate) is increased to improve combustion stability. Here, when the opening of the exhaust choke valve is reduced, since the circulation resistance of the exhaust gas which passes through the exhaust passage (exhaust circulation resistance) increases, there is a concern that the pumping loss may increase and fuel efficiency may be lowered. However, it is discovered from the results of the examination that a fuel efficiency improvement amount by making the air-fuel ratio leaner exceeds a fuel efficiency degradation amount by reducing the opening of the exhaust choke valve, depending on temperature conditions, even under the situation with the insufficient warm-up.

According to one aspect of the present disclosure, a control device for a premixed compression ignition engine is provided. The engine includes a combustion chamber, an injector configured to inject fuel into the combustion chamber, an intake valve configured to open and close an intake port configured to introduce intake air into the combustion chamber, an exhaust valve configured to open and close an exhaust port configured to discharge exhaust gas from the combustion chamber, an intake passage connected to the intake port, and an exhaust passage connected to the exhaust port. The control device includes an air amount adjusting mechanism, including at least a throttle valve, configured to adjust an amount of air introducing into the combustion chamber, a variable valve mechanism configured to change a valve overlap period when an open period of the intake valve and an open period of the exhaust valve overlap with each other, an exhaust choke valve provided to the exhaust passage so as to open and close the exhaust passage, a water temperature sensor configured to acquire a given temperature parameter that increases as a warm-up of the engine progresses, and a processor configured to execute a combustion controlling module to control the variable valve mechanism so that the valve overlap period of a given amount or more is formed in a low-load range where the engine load is low, and control the injector, the air amount adjusting mechanism, and the exhaust choke valve so that an air-fuel ratio (A/F) lean mixture gas having an air-fuel ratio greater than a stoichiometric air fuel ratio is formed inside the combustion chamber, and premixed compression ignition combustion of the mixture gas is carried out. During the operation in the low-load range, the combustion controlling module makes an opening of the exhaust choke valve, when the temperature parameter acquired by the water temperature sensor is low, smaller than the opening of the exhaust choke valve when the temperature parameter is high.

According to this configuration, when the A/F lean premixed compression ignition combustion is performed in the situation where the engine temperature is relatively low and the engine load is low, the control is executed in which the opening of the exhaust choke valve is reduced while forming the valve overlap period of the given amount or more. Accordingly, the rate of internal EGR gas (internal EGR rate), which is exhaust gas drawn back to the combustion chamber from the exhaust port during the valve overlap period, can be fully increased because an exhaust circulation resistance is increased due to the reduction in the opening of the exhaust choke valve. Therefore, since the temperature inside the combustion chamber before the mixture gas ignites (in-cylinder temperature) increases, the A/F lean environment where the engine temperature is low and the mixture gas is easily ignited can be created inside the combustion chamber, thereby improving the combustion stability of the mixture gas. Since the reduction in the opening of the exhaust choke valve leads to an increase in the exhaust circulation resistance (as a result, an increase in a pumping loss), it is originally disadvantageous in respect of fuel efficiency. However, the combination of the improvement in combustion stability by increasing the internal EGR rate with the effect of making the air-fuel ratio leaner (the drop of the combustion temperature, and the reduction of the pumping loss) can sufficiently improve efficiency, even if counteracted by the degradation in fuel efficiency due to the increase in the exhaust circulation resistance. Therefore, for example, compared with the case where the premixed compression ignition combustion of the mixture gas is carried out under the stoichiometric environment where the air-fuel ratio inside the combustion chamber is near a stoichiometric air fuel ratio, fuel efficiency can be substantially improved.

On the other hand, when the A/F lean premixed compression ignition combustion is performed in the situation where the engine temperature is relatively high and the engine load is low, since the opening of the exhaust choke valve is increased, the exhaust passage can be avoided from being unnecessarily choked under the situation where the engine temperature is high and the ignitability of the mixture gas is improved, thereby reducing the exhaust circulation resistance, while ensuring combustion stability. Therefore, since the pumping loss when the warm-up progresses is fully reduced, fuel efficiency can be improved more effectively.

During the operation in the low-load range, the combustion controlling module may make the opening of the exhaust choke valve smaller as the temperature parameter decreases.

According to this configuration, the amount of internal EGR gas can be adjusted appropriately according to the engine temperature (a degree of progress of the warm-up) which influences the ignitability of the mixture gas. Moreover, since the opening of the exhaust choke valve is increased as the engine temperature becomes higher (as the ignitability becomes better), fuel efficiency can be improved, while reducing the exhaust circulation resistance (pumping loss) as much as possible.

When the opening of the exhaust choke valve when the temperature parameter during the operation in the low-load range is greater than or equal to a first threshold and less than a second threshold is a first opening, the opening of the exhaust choke valve when the temperature parameter is greater than or equal to the second threshold and less than a third threshold is a second opening, and the opening of the exhaust choke valve when the temperature parameter is greater than or equal to the third threshold is a third opening, the combustion controlling module may control the exhaust choke valve so that the first opening and the third opening are constant regardless of the temperature parameter, the third opening is larger than the first opening, and the second opening increases in proportion to the temperature parameter between the first opening and the third opening.

According to this configuration, the internal EGR rate can be made the highest under the low-temperature condition where the ignitability declines, the internal EGR rate can be gradually decreased according to the improvement in the ignitability due to the temperature increase, and the internal EGR rate can be made the lowest under the high-temperature condition where the ignitability is appropriate. Therefore, since a suitable amount of internal EGR gas for the temperature condition (ignitability) is introduced into the combustion chamber, combustion stability can be secured appropriately in the broad temperature range.

A low-speed side part of the low-load range may be a first low-speed subdivided range, and a part of the low-load range that is at a higher speed side than the first low-speed subdivided range may be a first high-speed subdivided range. Under a condition where the temperature parameter is constant, the combustion controlling module may make the opening of the exhaust choke valve in the first high-speed subdivided range smaller than the opening of the exhaust choke valve in the first low-speed subdivided range.

According to this configuration, during the operation in the low-load range, combustion stability can be improved, while securing the sufficient internal EGR rate, regardless of the engine speed. For example, in the high-speed side range where the advancing speed of the crank angle per unit time is fast, since the actual time corresponding to the valve overlap period becomes shorter, the sufficient internal EGR rate cannot be obtained in the part of the low-load range that is at the higher speed side if the opening of the exhaust choke valve is constant regardless of the engine speed, and combustion stability may not be significantly improved. On the other hand, in this configuration, since the opening of the exhaust choke valve is made relatively smaller at the part of the high-speed side in the low-load range (first high-speed subdivided range), the sufficient internal EGR gas can be secured also under the condition where the actual time corresponding to the valve overlap period is short, and the situation as described above in which the combustion stability at the high-speed side declines, can be avoided.

When a low-speed side part of the low-load range is a second low-speed subdivided range, and a part of the low-load range that is at a higher speed side than the second low-speed subdivided range is a second high-speed subdivided range, under a condition where the temperature parameter is constant, the combustion controlling module may control the variable valve mechanism so that the valve overlap period in the second high-speed subdivided range becomes longer than the valve overlap period in the second low-speed subdivided range.

According to this configuration, by expanding the valve overlap period at the high-speed side where it is disadvantageous for securing the internal EGR rate, combustion stability can be improved, while ensuring a sufficient internal EGR rate, regardless of the engine speed.

The engine may be provided with an ignition plug configured to ignite the mixture gas inside the combustion chamber. The combustion controlling module may cause the ignition plug to perform a jump-spark ignition at a given timing near a compression top dead center so that, during the operation in the low-load range, partial compression ignition combustion in which a portion of the mixture gas combusts by flame propagation from an ignition point of the ignition plug, and the remaining mixture gas combusts by self-ignition is performed.

In such a case of configuring that the portion of mixture gas is combusted by flame propagation which is triggered by the jump-spark ignition by the ignition plug, the ignition timing of the mixture gas can accurately be adjusted according to the jump-spark ignition, and thus, an engine can be realized, which having an excellent practicability performing the stable output regardless of the external environment, the load, etc.

When the engine is operated in the low-load range and the temperature parameter is below a given value, the combustion controlling module may cause the injector to perform an early injection in which fuel is injected in an intake stroke, and a retarded injection in which fuel is injected in the second half of a compression stroke, and when the engine is operated in the low-load range and the temperature parameter is greater than or equal to the given value, the combustion controlling module may control the injector so that an injection amount ratio of the early injection increases and an injection amount ratio of the retarded injection decreases, compared with the case when the temperature parameter is less than the given value.

According to this configuration, since a stratified mixture gas in which the mixture gas around the ignition plug becomes relatively rich can be formed inside the combustion chamber, the generation of the flame propagation accompanying the jump-spark ignition of the ignition plug (SI combustion) is stimulated and SPCCI combustion is stabilized. Since this further improves combustion stability under the comparatively low temperature environment, in addition to the effect caused by the reduction in the opening of the exhaust choke valve described above (and the increase in the internal EGR rate whereby), both the improvement in fuel efficiency by making the air-fuel ratio leaner and securing combustion stability can be achieved.

DETAILED DESCRIPTION OF THE DISCLOSURE (1) Overall Configuration of Engine

Figure 1:
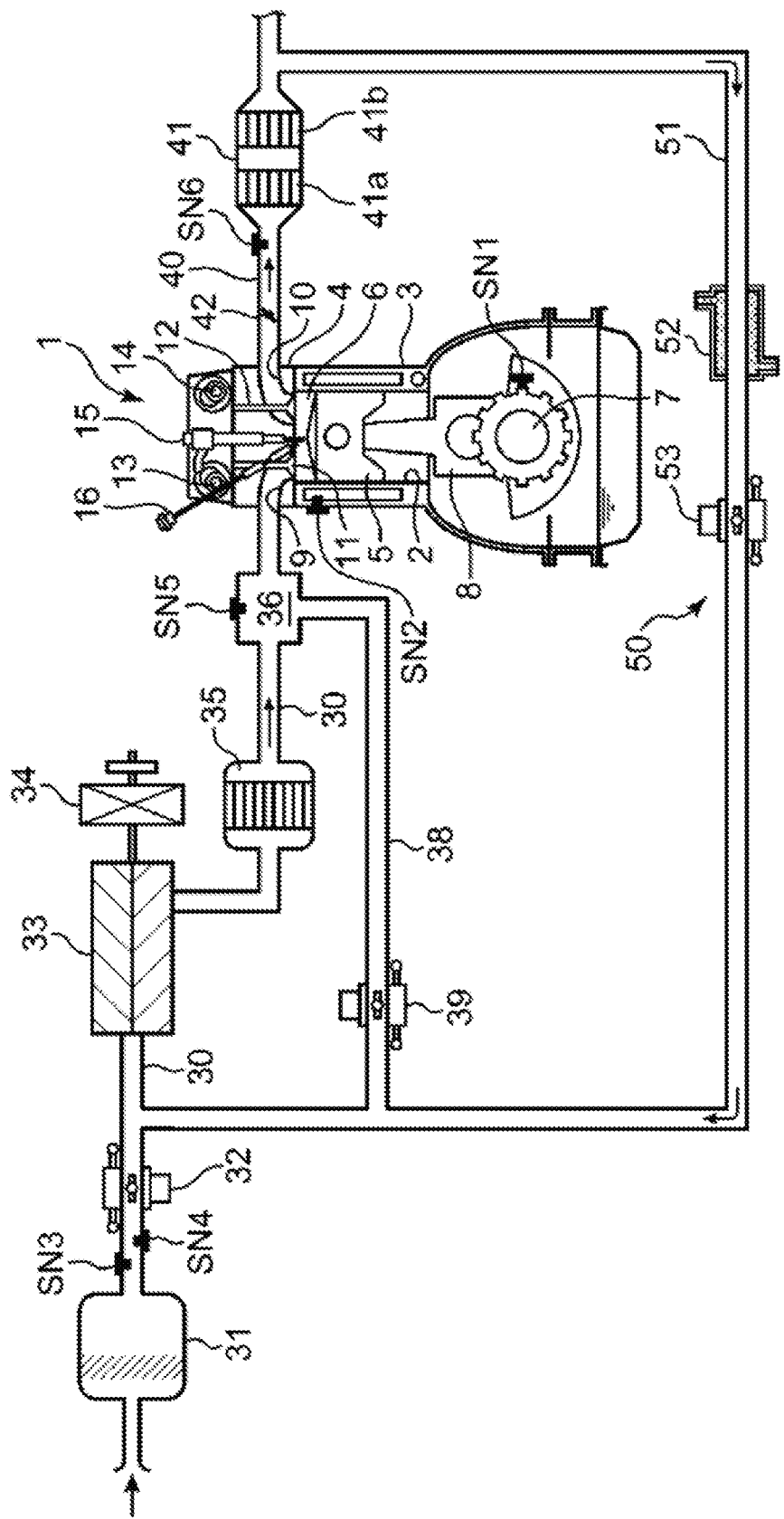
FIG. 1 is a system diagram schematically illustrating the overall configuration of a compression ignition engine according to one embodiment of the present disclosure.
Figure 2:
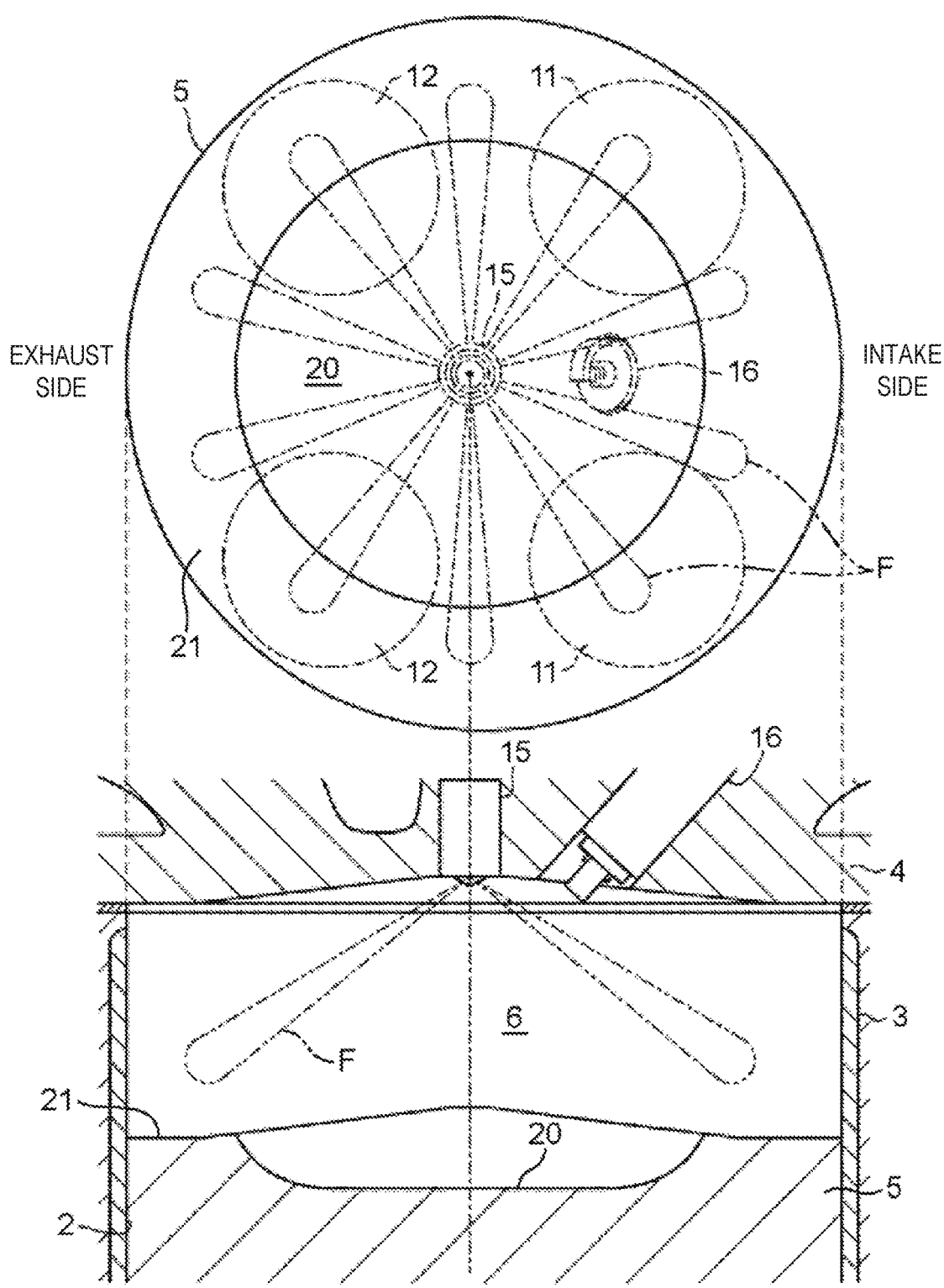
FIG. 2 is a view collectively illustrating a cross-sectional view of an engine body and a plan view of a piston.

FIGS. 1 and 2 are views illustrating a preferable embodiment of a compression ignition engine to which a control device of the present disclosure is applied (hereinafter, simply referred to as "the engine"). The engine illustrated in these figures is a four-cycle gasoline direct-injection engine mounted on the vehicle as a propelling source of the vehicle, and includes an engine body 1, an intake passage 30 where intake air introduced into the engine body 1 circulates, an exhaust passage 40 where exhaust gas discharged from the engine body 1 circulates, and an external exhaust gas recirculation (EGR) device 50 which recirculates a portion of exhaust gas which circulates through the exhaust passage 40 to the intake passage 30.

The engine body 1 has a cylinder block 3 where cylinders 2 are formed therein, a cylinder head 4 attached to an upper surface of the cylinder block 3 so as to cover up the cylinder 2 from above, and pistons 5 reciprocatably inserted in the respective cylinders 2. Although the engine body 1 is typically a multi-cylinder type having a plurality of cylinders (e.g., four), only one of the cylinders 2 is described herein for simplifying the description.

A combustion chamber 6 is defined above the piston 5, and fuel comprised of gasoline as its main component is supplied to the combustion chamber 6 by an injection from an injector 15 (described later). Then, the supplied fuel combusts inside the combustion chamber 6 while being mixed with air, and the expansive force produced by the combustion pushes the piston 5 to make the piston 5 reciprocate in the vertical direction.

Below the piston 5, a crankshaft 7 which is an output shaft of the engine body 1 is provided. The crankshaft 7 is connected with the piston 5 through a connecting rod 8, and is rotated on its center axis by the reciprocating motion (up-and-down motion) of the piston 5.

A geometric compression ratio of the cylinder 2, i.e., a ratio of a volume of the combustion chamber 6 when the piston 5 is at a top dead center to a volume of the combustion chamber 6 when the piston 5 is at a bottom dead center is set to a high compression ratio, 14:1 or higher and 20:1 or lower, and preferably 16:1 or higher and 18:1 or lower, as a suitable value for SPCCI combustion (partial compression ignition combustion) described later.

The cylinder block 3 is provided with a crank angle sensor SN1 which detects a rotational angle of the crankshaft 7 (crank angle) and a rotating speed of the crankshaft 7 (engine speed), and a water temperature sensor SN2 which detects temperature of cooling water which circulates inside the cylinder block 3 and the cylinder head 4 (engine water temperature). The engine water temperature detected by the water temperature sensor SN2 is a parameter which increases as a warm-up of the engine progresses, and is one example of a "temperature parameter" in the present disclosure.

The cylinder head 4 is provided with an intake port 9 for introducing air supplied from the intake passage 30 into the combustion chamber 6, an exhaust port 10 for leading exhaust gas generated inside the combustion chamber 6 to the exhaust passage 40, an intake valve 11 which opens and closes an opening of the intake port 9 at the combustion chamber 6 side, and an exhaust valve 12 which opens and closes an opening of the exhaust port 10 at the combustion chamber 6 side. Note that as illustrated in FIG. 2, the valve type of the engine of this embodiment is a four-valve type having two intake valves and two exhaust valves. That is, in this embodiment, two intake ports 9 and two exhaust ports 10 are opened to the combustion chamber 6 of one cylinder 2, and corresponding to this, two intake valves 11 and two exhaust valves 12 are provided to one cylinder 2.

The intake valve 11 and the exhaust valve 12 are driven by a valve operating mechanism including a pair of cam shafts disposed in the cylinder head 4 to be opened and closed in an interlocked manner with the rotation of the crankshaft 7.

An intake VVT 13 which can change the opening and closing timings of the intake valve 11 is built in the valve operating mechanism for the intake valve 11. Similarly, an exhaust VVT 14 which can change the opening and closing timings of the exhaust valve 12 is built in the valve operating mechanism for the exhaust valve 12. The intake VVT 13 (exhaust VVT 14) is a so-called phase variable mechanism, and changes the open timing and the close timing of the intake valve 11 (exhaust valve 12) simultaneously by the same amount. These intake and exhaust VVT 13 and 14 are one example of a "variable valve mechanism" in the present disclosure.

Figure 3:
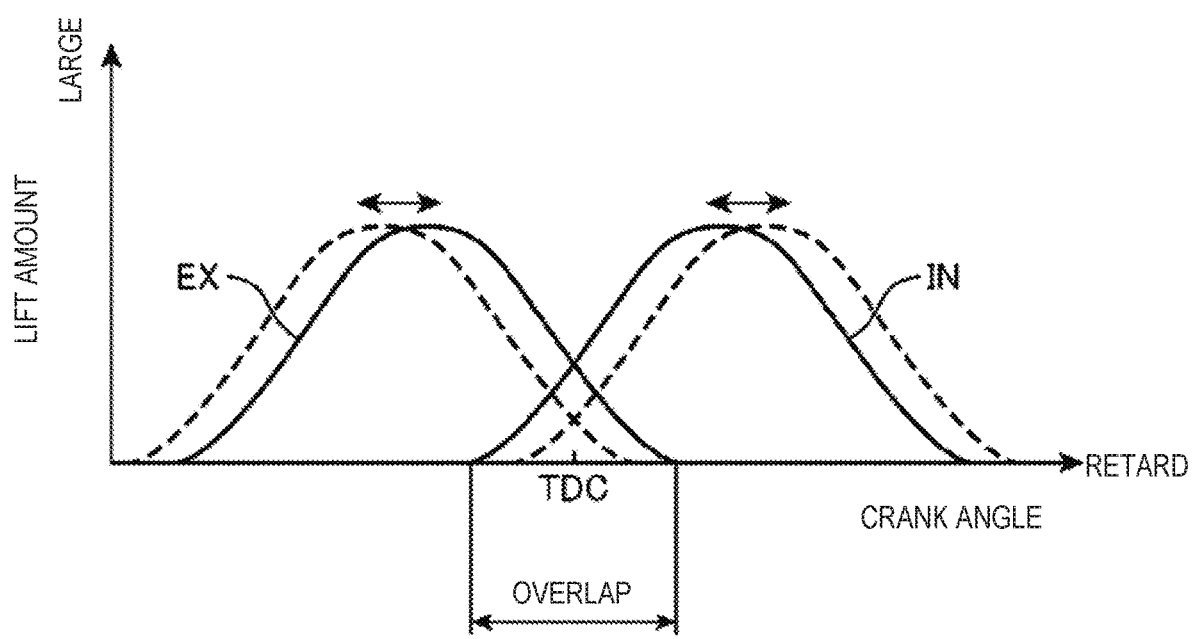
FIG. 3 is a view illustrating lift curves of an intake valve and an exhaust valve.

FIG. 3 is a view illustrating a lift curve of the intake valve 11 and the exhaust valve 12, where "IN" indicates the lift curve of the intake valve 11 and "EX" indicates the lift curve of the exhaust valve 12. As illustrated in this figure, the intake valve 11 and the exhaust valve 12 may be driven so that their valve opening periods overlap with each other, including an exhaust top dead center (TDC in FIG. 3). This overlap period, i.e., a period during which both the intake valve 11 and the exhaust valve 12 open is referred to as a "valve overlap period." The valve overlap period can be adjusted by controlling the intake VVT 13 and the exhaust VVT 14 described above. Waveforms of solid lines in FIG. 3 illustrate a case where the valve overlap period is comparatively lengthened, and in this case, by continuing the opening of the exhaust valve 12 until an early stage of an intake stroke after the exhaust top dead center (TDC), burnt gas (exhaust gas) is drawn back from the exhaust port 10 to the combustion chamber 6 to achieve internal EGR. On the contrary, as illustrated by waveforms of dashed lines, when the valve overlap period is shortened, an amount of the burnt gas drawn back from the exhaust port 10 (remained) as described above decreases, and, as the result, the internal EGR is reduced or suspended. Note that the lengthening or shortening of the valve overlap period is achieved by changing the open and close timings of both the intake valve 11 and the exhaust valve 12 (in other words, by both the intake VVT 13 and the exhaust VVT 14 being driven).

As illustrated in FIGS. 1 and 2, the cylinder head 4 is provided with the injector 15 which injects fuel (gasoline) into the combustion chamber 6, and an ignition plug 16 which ignites a mixture gas in which the fuel injected into the combustion chamber 6 from the injector 15 is mixed with intake air.

As illustrated in FIG. 2, a cavity 20 is formed in a crown surface of the piston 5, where a comparatively large area including a central part of the piston 5 is dented to the opposite side from the cylinder head 4 (downwardly). Moreover, a squish part 21 which is comprised of an annular flat surface is formed in the crown surface of the piston 5, radially outward of the cavity 20.

The injector 15 is a multiple nozzle-hole injector having a plurality of nozzle holes at a tip end, and it is capable of injecting fuel radiately from the plurality of nozzle holes (F in FIG. 2 indicates a fuel spray of fuel injected from each nozzle hole). The injector 15 is disposed in a central part of a ceiling surface of the combustion chamber 6 so that the tip end thereof opposes to the central part of the crown surface of the piston 5 (the center of the bottom surface of the cavity 20).

Although detailed illustration is omitted, the injector 15 is connected to a fuel rail which is common to all the cylinders 2 through a fuel supply pipe. Inside the fuel rail, high-pressure fuel which is pressurized by a fuel feed pump (not illustrated) is stored. By supplying the fuel stored in the fuel rail to the injector 15 of each cylinder 2, the fuel is injected from each injector 15 into the combustion chamber 6 at a comparatively high pressure (e.g., a pressure exceeding 20 MPa).

Between the fuel feed pump and the fuel rail, a fuel pressure regulator 17 (FIG. 4) which changes the pressure of fuel supplied to the injector 15 (fuel pressure) is provided.

The ignition plug 16 is disposed at a position somewhat offset to the intake side from the injector 15. The position of the tip-end part of the ignition plug 16 (electrode part) is set so as to overlap with the cavity 20 in a plan view.

As illustrated in FIG. 1, the intake passage 30 is connected to one side surface of the cylinder head 4 so as to communicate with the intake port 9. Air (fresh air) taken in from an upstream end of the intake passage 30 is introduced into the combustion chamber 6 through the intake passage 30 and the intake port 9.

The intake passage 30 is provided with, from the upstream side, an air cleaner 31 which removes foreign substances in the intake air, a throttle valve 32 which can open and close to adjust a flow rate of the intake air, a supercharger 33 which pumps the intake air while compressing the intake air, an intercooler 35 which cools the intake air which is compressed by the supercharger 33, and a surge tank 36. Note that the throttle valve 32 is one example of an "air amount adjusting mechanism" in the present disclosure. Note that in this embodiment, the introducing amount of air into the combustion chamber 6 varies also depending on the change of the valve timing of the intake and exhaust VVTs 13 and 14 described above, or open/close state of an EGR valve 53 described later. Thus, in this embodiment, the combination of the throttle valve 32, the intake and exhaust VVTs 13 and 14, and the EGR valve 53 is another example of the "air amount adjusting mechanism."

Respective parts of the intake passage 30 are provided with an airflow sensor SN3 which detects a flow rate of the intake air, an intake air temperature sensor SN4 which detects the temperature of the intake air, and an intake air pressure sensor SN5 which detects the pressure of the intake air. The airflow sensor SN3 and the intake air temperature sensor SN4 are provided to a part of the intake passage 30 between the air cleaner 31 and the throttle valve 32, and detect the flow rate and the temperature of the intake air which passes through this part, respectively. The intake air pressure sensor SN5 is provided to the surge tank 36 and detects the pressure of the intake air inside the surge tank 36.

The supercharger 33 is a mechanical supercharger which is mechanically coupled to the engine body 1. As the supercharger 33, it is not limited but any one of known superchargers, such as a Lysholm type, a root type, and a centrifugal type, can be used.

Between the supercharger 33 and the engine body 1, an electromagnetic clutch 34 which can electrically switch between its engagement state and disengagement state is provided. When the electromagnetic clutch 34 is engaged, a driving force is transmitted to the supercharger 33 from the engine body 1, and boosting by the supercharger 33 is then performed. On the other hand, when the electromagnetic clutch 34 is disengaged, the transmission of the driving force is intercepted, and the boosting by the supercharger 33 is suspended.

The intake passage 30 is provided with a bypass passage 38 for bypassing the supercharger 33. The bypass passage 38 connects the surge tank 36 with an EGR passage 51 (described later). The bypass passage 38 is provided with a bypass valve 39 which can be opened and closed.

The exhaust passage 40 is connected to the other side surface (opposite surface of the intake passage 30) of the cylinder head 4 so as to communicate with the exhaust port 10. The burnt gas generated inside the combustion chamber 6 is discharged outside through the exhaust port 10 and the exhaust passage 40.

The exhaust passage 40 is provided with a catalytic converter 41. A three-way catalyst 41a for purifying hazardous components (HC, CO, and NOR) contained in exhaust gas circulating the exhaust passage 40, and a GPF (Gasoline Particulate Filter) 41b for collecting particulate matter (PM) contained in the exhaust gas are built in the catalytic converter 41.

An exhaust choke valve 42 is openably and closably provided to the exhaust passage 40 upstream of the catalytic converter 41. Moreover, an air-fuel ratio (A/F) sensor SN6 which detects an oxygen concentration in exhaust gas is provided to a part of the exhaust passage 40 between the exhaust choke valve 42 and the catalytic converter 41.

The external EGR device 50 has the EGR passage 51 which connects the exhaust passage 40 with the intake passage 30, and an EGR cooler 52 and the EGR valve 53 provided to the EGR passage 51. The EGR passage 51 connects a part of the exhaust passage 40 downstream of the catalytic converter 41 with a part of the intake passage 30 between the throttle valve 32 and the supercharger 33. The EGR cooler 52 cools exhaust gas which recirculates from the exhaust passage 40 to the intake passage 30 through the EGR passage 51 (external EGR gas) by heat exchange. The EGR valve 53 is provided to the EGR passage 51 downstream of the EGR cooler 52 (closer to the intake passage 30) so as to be opened and closed, and adjusts a flow rate of exhaust gas which circulates the EGR passage 51.

(2) Control System

Figure 4:
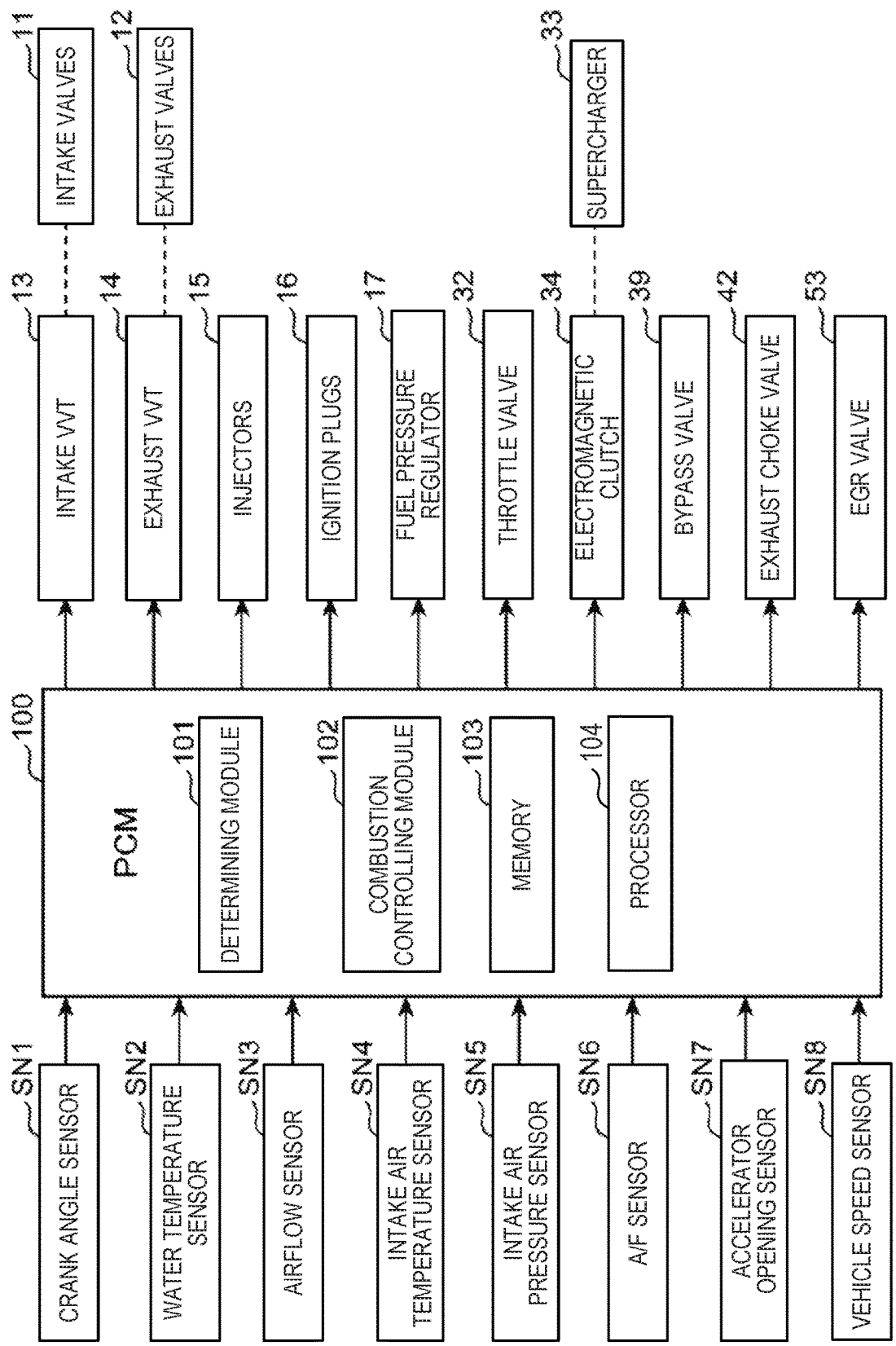
FIG. 4 is a block diagram illustrating a control system of the engine.

FIG. 4 is a block diagram illustrating a control system of the engine. A PCM (powertrain control module) 100 illustrated in this figure is a microcomputer for comprehensively controlling the engine, etc., and is comprised of a processor 104 (e.g., a central processing unit (CPU)) which executes software programs and memory 103 that includes ROM and RAM, etc. which are well known.

Detection signals of various sensors are inputted into the PCM 100. For example, the PCM 100 is electrically connected to the crank angle sensor SN1, the water temperature sensor SN2, the airflow sensor SN3, the intake air temperature sensor SN4, the intake air pressure sensor SN5, and the A/F sensor SN6 which are described above. Information detected by these sensors (i.e., a crank angle, an engine speed, an engine water temperature, an intake air flow rate, an intake air temperature, an intake pressure, and an oxygen concentration) are sequentially inputted into the PCM 100.

Moreover, the vehicle is provided with an accelerator opening sensor SN7 which detects an opening of an accelerator pedal (hereinafter, referred to as "the accelerator opening") operated by a driver who operates the vehicle, and a vehicle speed sensor SN8 which detects a traveling speed of the vehicle (hereinafter, referred to as "the vehicle speed"). Detection signals of these sensors SN7 and SN8 are also sequentially inputted into the PCM 100.

The PCM 100 controls each part of the engine, while performing various determinations, calculations, etc. based on the input information from the corresponding sensor(s). That is, the PCM 100 is electrically connected, for example, to the intake and exhaust VVTs 13 and 14, the injector 15, the ignition plug 16, the fuel pressure regulator 17, the throttle valve 32, the electromagnetic clutch 34, the bypass valve 39, the exhaust choke valve 42, and the EGR valve 53, and based on the result(s) of the calculation(s), etc., it outputs a control signal to the corresponding device.

In detail, the PCM 100 further comprises a determining module 101 and a combustion controlling module 102 stored in the memory 103 as software modules. The processor 104 is configured to execute these modules to perform their respective functions.

The combustion controlling module 102 is a control module which controls combustion of the mixture gas inside the combustion chamber 6, and controls each part of the engine so that an output torque, etc. of the engine becomes a suitable value according to a demand of a driver. The determining module 101 is a control module which performs various determinations required for determining contents of the control executed by the combustion controlling module 102. The memory 103 stores various data required for processings in the determining module 101 and the combustion controlling module 102.

(3) Control According to Operating State

Figure 5:
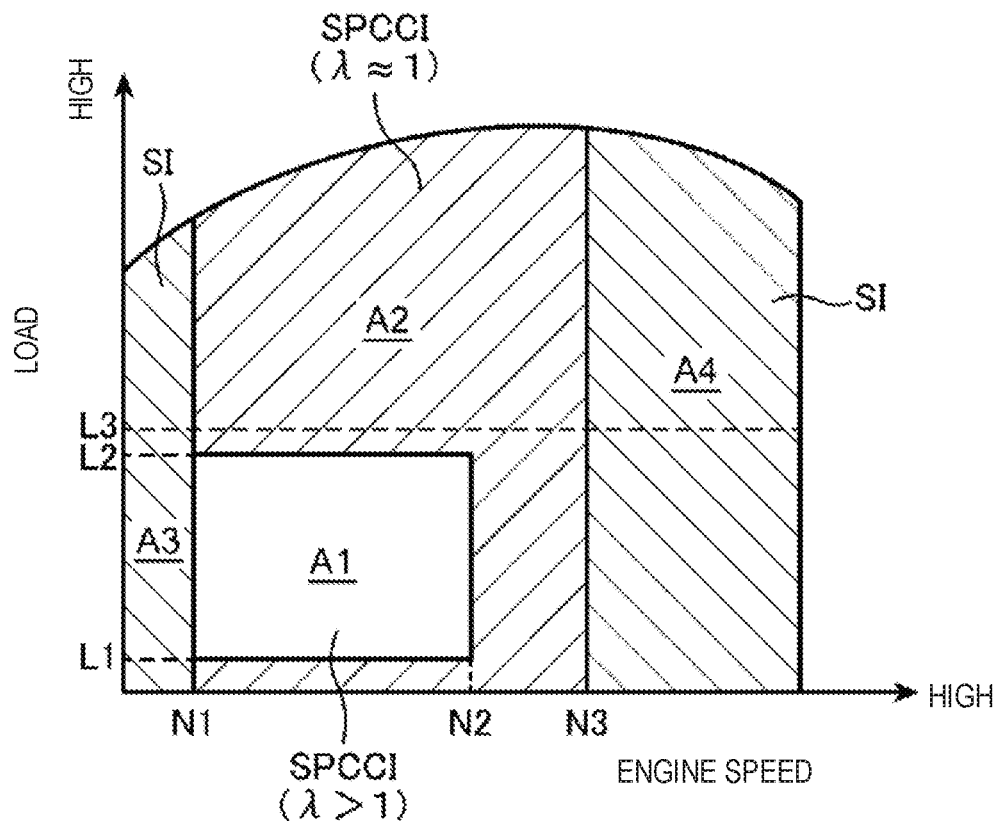
FIG. 5 is an operation map in which an operating range of the engine is classified by a difference in a combustion mode.

FIG. 5 is an operation map used under a condition where an engine water temperature T is a first threshold T1 determined beforehand or higher, and is a view illustrating a difference of control according to the engine speed and load. Note that in this embodiment, the first threshold T1 is set to 70° C.

As illustrated in FIG. 5, when the engine water temperature T is the first threshold T1 (70° C.) or higher, the operating range of the engine is roughly divided into four operating ranges A1-A4 according to the difference in the combustion mode. Suppose the four operating ranges are a first operating range A1, a second operating range A2, a third operating range A3, and a fourth operating range A4, the third operating range A3 is an extremely low-speed range where the engine speed is lower than a first speed N1, and the fourth operating range A4 is a high-speed range where the engine speed is a third speed N3 or higher, and the first operating range A1 is a low-speed low-load range where the load is comparatively low, other than the third and fourth operating range A3 and A4 (low and middle-speed range), and the second operating range A2 is a remaining range other than the first, third, and fourth operating ranges A1, A3, and A4.

The first operating range A1 is an example of a "low-load range" in the present disclosure. According to the example of FIG. 5, the first operating range A1 is a range of a substantially rectangular shape located inside the second operating range A2, and is surrounded by the first speed N1 which is a lower-limit speed of the second operating range A2, the second speed N2 lower than an upper-limit speed (third speed N3) of the second operating range A2, a first load L1 higher than the minimum load of the engine, and a second load L2 higher than the first load L1. The second load L2 which is an upper-limit load of the first operating range A1 is set to a value slightly lower than a third load L3 which is a lower-limit load at which the supercharger 33 can be driven. That is, the first operating range A1 is set so as not overlap with the boosting area where the boost by the supercharger 33 is performed.

Below, an outline of a combustion control in the first to fourth operating ranges A1-A4 is described.

(3-1) First Operating Range

In the first operating range A1 with the low speed and the low load, partial compression ignition combustion in which spark ignition (SI) combustion and compression ignition (CI) combustion are combined is performed (hereinafter, referred to as SPCCI combustion). SI combustion is a combustion mode in which the mixture gas is ignited by sparks generated from the ignition plug 16, and the mixture gas is forcibly combusted by flame propagation which extends a combustion range from an ignited point to the perimeter. CI combustion is a combustion mode in which the mixture gas is combusted by a self-ignition under the environment where the mixture gas is brought to a sufficiently high temperature and high pressure by compression of the piston 5. The SPCCI combustion which is the combination of SI combustion and CI combustion is a combustion mode in which SI combustion of a portion of the mixture gas inside the combustion chamber 6 is performed by a jump-spark ignition performed under the environment where the mixture gas is about to self-ignite, and CI combustion of the remaining mixture gas inside the combustion chamber 6 is performed by a self-ignition after the SI combustion (i.e., by the further increase in the temperature and the pressure accompanying the SI combustion). Note that "SPCCI" is an abbreviation for "SPark Controlled Compression Ignition."

Figure 6:
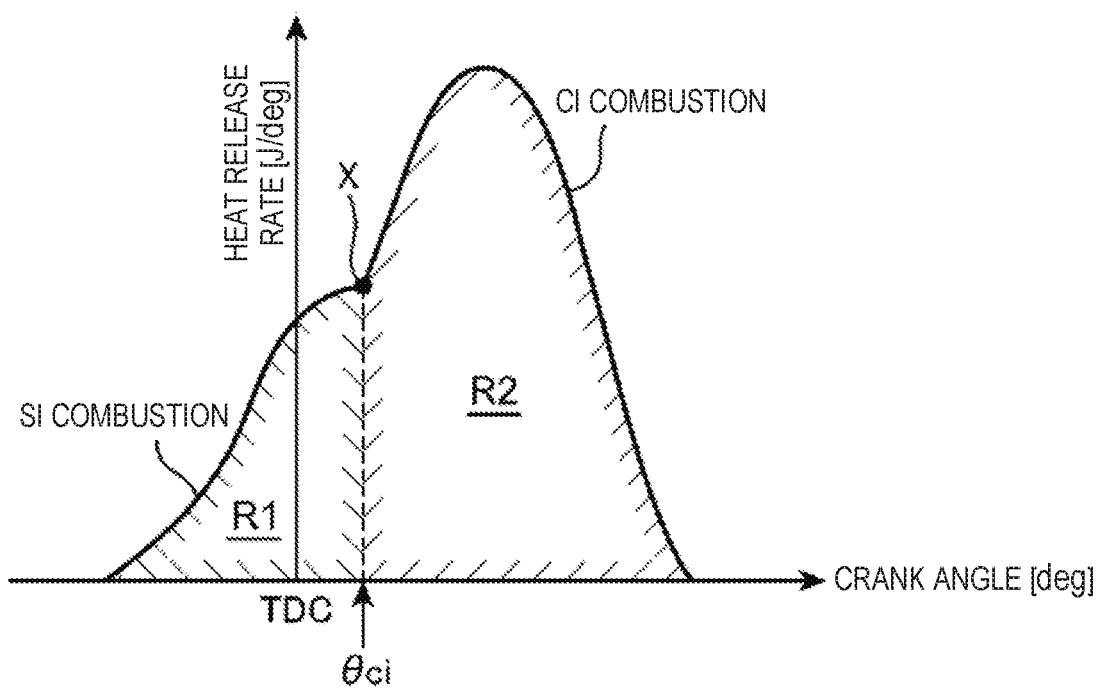
FIG. 6 is a graph illustrating a waveform of a rate of heat release during SPCCI combustion (partial compression ignition combustion).

FIG. 6 illustrates a graph illustrating a combustion waveform, i.e., a change in a rate of heat release (J/deg) by a crank angle, when the SPCCI combustion described above is performed. As illustrated in this figure, in SPCCI combustion, a heat release by SI combustion and a heat release by CI combustion are continuously generated in this order. At this time, due to the nature in which a combusting rate of CI combustion is quicker, a rise of the heat release of CI combustion is steeper than that of SI combustion. For this reason, the waveform of the rate of heat release in SPCCI combustion has a point of inflection X which appears at a timing of switching from SI combustion to CI combustion (θci, described later).

As a specific mode of such SPCCI combustion, in the first operating range A1, a control in which an A/f lean mixture gas having an air-fuel ratio larger than a stoichiometric air-fuel ratio is formed inside the combustion chamber 6, and SPCCI combustion of the mixture gas is carried out, in other words, a control in which SPCCI combustion of the mixture gas at λ>1 (λ is an excess air factor) is carried out, is performed. In order to achieve such A/F-lean SPCCI combustion, in the first operating range A1, each part of the engine is controlled by the PCM 100 as follows.

The opening of the throttle valve 32 is set to a comparatively large value so that an amount of air more than the amount of air corresponding to a stoichiometric air-fuel ratio is introduced into the combustion chamber 6 through the intake passage 30. That is, in the first operating range A1, a target value of the air-fuel ratio (A/F) which is a weight ratio of air (fresh air) introduced into the combustion chamber 6 through the intake passage 30 to fuel injected into the combustion chamber 6 from the injector 15 is set to a value larger than the stoichiometric air-fuel ratio (14.7:1) (for example, about 20:1 to about 35:1). Then, based on the target value of the air-fuel ratio (target air-fuel ratio) and the oxygen concentration, etc. in exhaust gas detected by the A/F sensor SN6, the opening of the throttle valve 32 is determined so that the air-fuel ratio inside the combustion chamber 6 is in agreement with the target air-fuel ratio, and the throttle valve 32 is controlled according to this determination.

The supercharger 33 is suspended. That is, since the first operating range A1 is located at a lower load side of the third load L3 which is the lower limit of the load range which requires boosting, the boost by the supercharger 33 is unnecessary. Therefore, in the first operating range A1, the electromagnetic clutch 34 is released to disconnect the supercharger 33 from the engine body 1, and the bypass valve 39 is fully opened, to suspend the boost by the supercharger 33.

Here, in SPCCI combustion which is the combination of SI combustion and CI combustion, it is important to control a ratio of SI combustion and CI combustion according to the operating condition. In this embodiment, focusing on a SI ratio which is a ratio of an amount of heat release by SI combustion to the total amount of heat release by SPCCI combustion (SI combustion and CI combustion), each part of the engine is controlled so that the SI ratio becomes an appropriate value.

The SI ratio is described with reference to FIG. 6. In FIG. 6, suppose that the crank-angle θci corresponding to the point of inflection X at which the combustion mode changes from SI combustion to CI combustion is a start timing of CI combustion. In this case, the amount of heat release by SI combustion corresponds to a waveform area R1 of the rate of heat release at the advancing side of θci (start timing of CI combustion), and the amount of heat release by CI combustion corresponds to a waveform area R2 of the rate of heat release at the retarded side of θci. The SI ratio can be defined as R1/(R1+R2) using the areas R1 and R2.

In the first operating range A1 where SPCCI combustion is performed, each part of the engine is controlled so that the SI ratio and θci which are described above match with target values defined beforehand. That is, in the first operating range A1, a target SI ratio which is a target value of the SI ratio and a target θci which is a target value of θci are defined, respectively, for each of various conditions with different engine loads and speeds. Then, a plurality of parameters, such as an injection amount and an injection timing of fuel from the injector 15, a timing of the jump-spark ignition by the ignition plug 16 (ignition timing), and an EGR rate (an external EGR rate and an internal EGR rate) are controlled so as to become a combination which can realize the target SI ratio and the target θci. Note that the external EGR rate is a weight ratio of the external EGR gas (exhaust gas which recirculates to the combustion chamber 6 through the EGR passage 51) to the entire gas inside the combustion chamber 6. The internal EGR rate is a weight ratio of the internal EGR gas (burnt gas which remains inside the combustion chamber 6 by the internal EGR) to the entire gas inside the combustion chamber 6.

For example, the injection amount and the injection timing of fuel are determined by using a map defined beforehand in consideration of the target SI ratio and the target θci. Moreover, for the external EGR rate and the internal EGR rate, the open and close timings of the intake and exhaust valves 11 and 12 (valve overlap period) which are the main influencing factors of both EGR rates, and the opening of the EGR valve 53 are determined by using a map which is also defined in consideration of the target SI ratio and the target θci.

On the other hand, the timing of the jump-spark ignition (ignition timing) by the ignition plug 16 is determined as a timing at which the target SI ratio and the target θci are obtained by the calculation using a given model formula.

Figure 9:
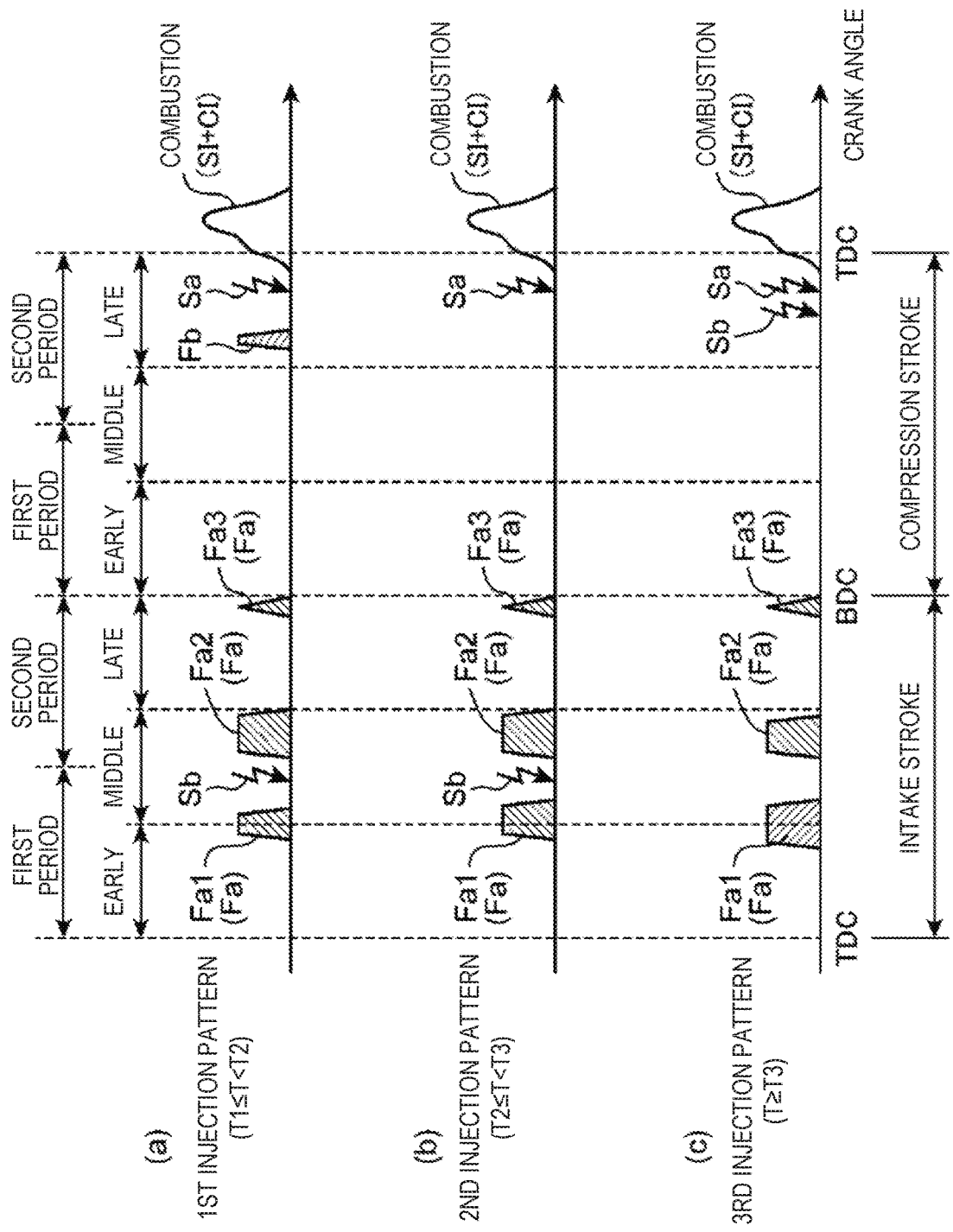
FIG. 9 is a time chart illustrating patterns of a fuel injection and a jump-spark ignition performed in a first operating range (low-load range) of the engine, where Charts (a) to (c) illustrate the patterns in conditions with different engine water temperatures.

Here, in the first operating range A1, a plurality of jump-spark ignitions are performed (here, twice) per one combustion cycle. That is, in the first operating range A1, in order to secure ignition stability that is also sufficient under the A/F lean environment, a main ignition Sa which is a normal jump-spark ignition (performed near a compression top dead center) for forcibly igniting the mixture gas, and additionally, a preceding ignition Sb which generates sparks earlier than the main ignition are performed, as illustrated in FIG. 9 (described later). In this case, the timing of the main ignition Sa is determined using the model formula. Note that the timing of the preceding ignition Sb is suitably determined based on the fuel injection timing, the engine water temperature, etc.

As described above, in the first operating range A1, by the method in which the map defined beforehand and the calculation using the model formula are combined, the ignition timings (timings of the main ignition and the preceding ignition), the injection amount and the injection timing of fuel, the open and close timings of the intake and exhaust valves 11 and 12, and the opening of the EGR valve 53 are controlled to become a combination so that the appropriate SI ratio and θci (the target SI ratio and the target θci) which are defined beforehand for every operating condition are obtained.

(3-2) Second Operating Range

Also in the second operating range A2, which is a speed range equal to or higher than the first speed N1 and lower than the third speed N3 (low and middle-speed range), excluding the first operating range A1, the control for combusting the mixture gas by SPCCI combustion is performed. Note that in the second operating range A2, unlike the first operating range A1, the air-fuel ratio (A/F) in the combustion chamber 6 is set near the stoichiometric air-fuel ratio, and the number of jump-spark ignitions by the ignition plug 16 is restricted to once per cycle.

That is, in the second operating range A2, the opening of the throttle valve 32 is set to an opening at which the amount of air equivalent to a stoichiometric air-fuel ratio is introduced into the combustion chamber 6 through the intake passage 30, i.e., an opening at which the air-fuel ratio (A/F) which is the weight ratio of air (fresh air) to fuel inside the combustion chamber 6 is substantially in agreement with a stoichiometric air-fuel ratio (14.7:1). In other words, in the second operating range A2, a control is performed in which SPCCI combustion of the mixture gas is carried out under a stoichiometric environment where the air-fuel ratio inside the combustion chamber 6 becomes near the stoichiometric air-fuel ratio ($\lambda \approx 1$).

Moreover, the jump-spark ignition by the ignition plug 16 is performed near a compression top dead center at a frequency of once per cycle. That is, in the second operating range A2, only the normal jump-spark ignition which forcibly ignites the mixture gas is performed near a compression top dead center, and the ignition equivalent to the preceding ignition described above is not performed.

Here, also in the second operating range A2, the target SI ratio and the target θci are defined for every condition of the engine speed and load, similar to the first operating range A1 described above. The injection amount and the injection timing of fuel, the open and close timings of the intake and exhaust valves 11 and 12, and the opening of the EGR valve 53 are determined using the map defined beforehand so that they become values suitable for achieving the target SI ratio and the target θci. Moreover, for the ignition timing by the ignition plug 16, the ignition timing which can achieve the target SI ratio and the target θci is determined by the calculation using the given model formula.

The supercharger 33 is driven or suspended according to whether the engine load is higher or lower than the third load L3. That is, the supercharger 33 is driven in a partial range of the second operating range A2 at the high load side where the engine load becomes the third load L3 or higher, and is suspended in a partial area of the second operating range A2 at the low load side where the engine load becomes lower than the third load L3. In the range at the high load side where the supercharger 33 is driven, the boost by the supercharger 33 is performed by connecting the electromagnetic clutch 34 to connect the supercharger 33 with the engine body 1. At this time, the opening of the bypass valve 39 is controlled so that the pressure inside the surge tank 36 (boosting pressure) detected by the intake air pressure sensor SN5 becomes in agreement with a target pressure defined beforehand for every condition of the engine speed and load.

(3-3) Third Operating Range and Fourth Operating Range

In the third operating range A3 (very low-speed range) where the engine speed is lower than the first speed N1, and the fourth operating range A4 (high-speed range) where the engine speed is the third speed N3 or higher, a control for combusting the mixture gas by SI combustion is performed. For example, while the entire amount of fuel to be injected in one cycle is injected during an intake stroke from the injector 15, the jump-spark ignition by the ignition plug 16 is performed near a compression top dead center. Then, SI combustion is started triggered by this jump-spark ignition, and all the mixture gas inside the combustion chamber 6 combusts by flame propagation.

(4) Injection and Ignition Control in First Operating Range

Figure 7:
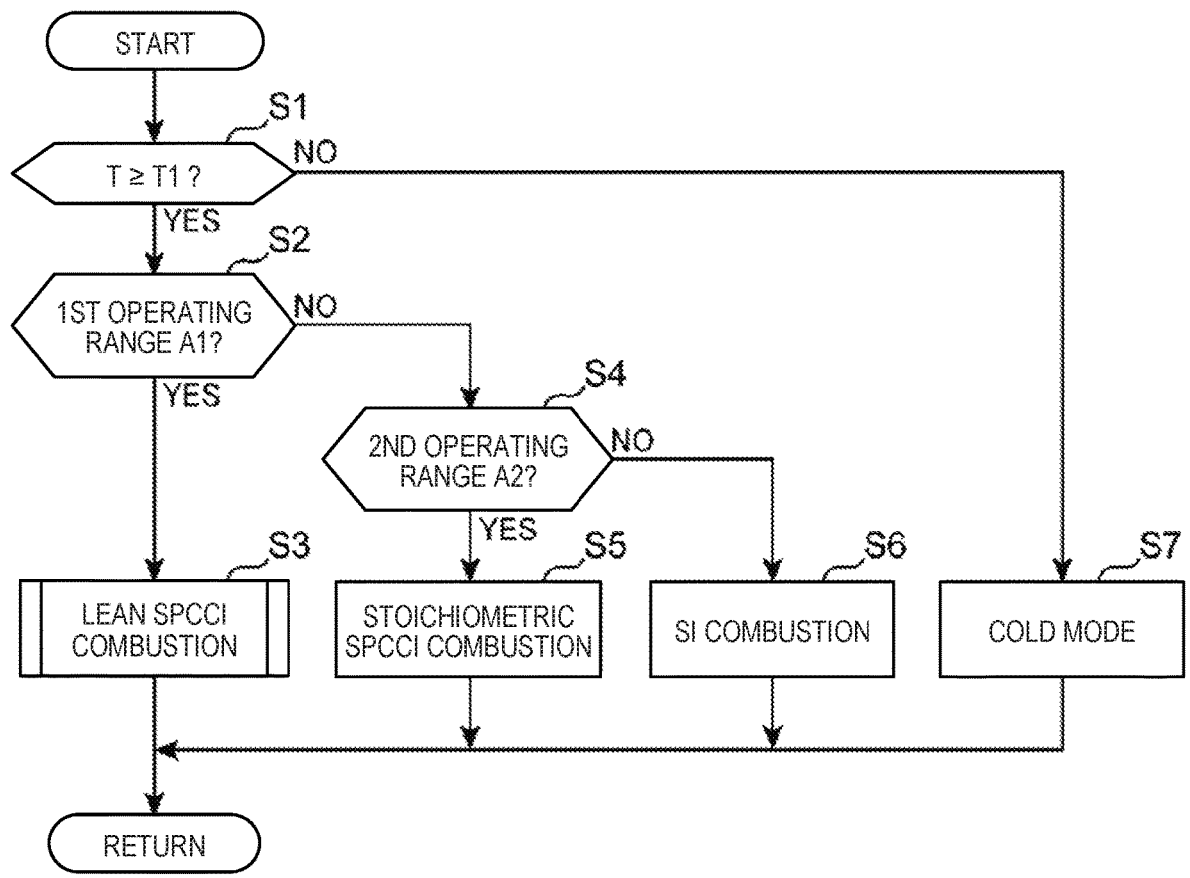
FIG. 7 is a flowchart illustrating a control operation executed during operation of the engine.

Next, a more specific example of the control in the first operating range A1, particularly, an example of the control related to the fuel injection and the jump-spark ignition is described with reference to FIGS. 7 and 8. When the control illustrated in a flowchart of FIG. 7 starts, the determining module 101 of the PCM 100 determines whether the engine water temperature T detected by the water temperature sensor SN2 is the first threshold T1 (70° C.) or higher at Step S1.

If it is determined as NO at Step S1 and it is confirmed that the engine water temperature T is lower than T1, the combustion controlling module 102 of the PCM 100 shifts to Step S7, where a combustion control based on an operation map different from the operation map illustrated in FIG. 5 in a mode of the combustion control which is suitable for the low engine water temperature (cold mode) is performed. In the cold mode, the combustion mode in which ignition stability can be secured even if the engine water temperature is low is selected. Although the specific combustion mode may change according to the engine water temperature T, for example, when the engine water temperature T is greatly below the first threshold T1 (70° C.), it is possible to perform SI combustion in all the operating ranges, while prohibiting SPCCI combustion. Moreover, when the engine water temperature T is slightly lower than the first threshold T1, it is possible to make the mode of SPCCI combustion into a different mode from that when T≥T1 (e.g., the air-fuel ratio in the range equivalent to the first operating range A1 illustrated in FIG. 5 is not set lean, but it is set near the stoichiometric air-fuel ratio), while adopting the mode which uses both SPCCI combustion and SI combustion similar to FIG. 5.

On the other hand, if it is determined as YES at Step S1, and it is confirmed that the engine water temperature T is the first threshold T1 or higher, the determining module 101 shifts to Step S2, where it determines whether the current operation point of the engine is included in the first operating range A1 illustrated in FIG. 5. That is, based on the engine speed detected by the crank angle sensor SN1, and the engine load identified from the detection value of the accelerator sensor SN7 (accelerator opening), the detection value of the vehicle speed sensor SN8 (vehicle speed), etc., the determining module 101 identifies the current operation point of the engine on the operation map of FIG. 5, and determines whether the current operation point is included in the first operating range A1 in the map.

If it is determined as YES at Step S2 and it is confirmed that the current operation point of the engine is included in the first operating range A1, the combustion controlling module 102 shifts to Step S3, where a control is performed in which SPCCI combustion of the mixture gas is carried out, while adjusting the air-fuel ratio inside the combustion chamber 6 to a value larger than a stoichiometric air-fuel ratio ($\lambda$>1) (lean SPCCI combustion).

On the other hand, if it is determined as NO at Step S2 and it is confirmed that the current operation point of the engine is not included in the first operating range A1, the determining module 101 shifts to Step S4, where it determines whether the current operation point is included in the second operating range A2.

If it is determined as YES at Step S4 and it is confirmed that the current operation point of the engine is included in the second operating range A2, the combustion controlling module 102 shifts to Step S5, where a control is performed in which SPCCI combustion of the mixture gas is carried out, while adjusting the air-fuel ratio inside the combustion chamber 6 to near the stoichiometric air-fuel ratio ($\lambda\approx1$) (stoichiometric SPCCI combustion).

On the other hand, if it is determined as NO at Step S4, that is, it is confirmed that the current operation point of the engine is included in the third operating range A3 or the fourth operating range A4 illustrated in FIG. 5, the combustion controlling module 102 shifts to Step S6, where it performs a control in which the mixture gas is combusted not by SPCCI combustion but by SI combustion.

Figure 8:
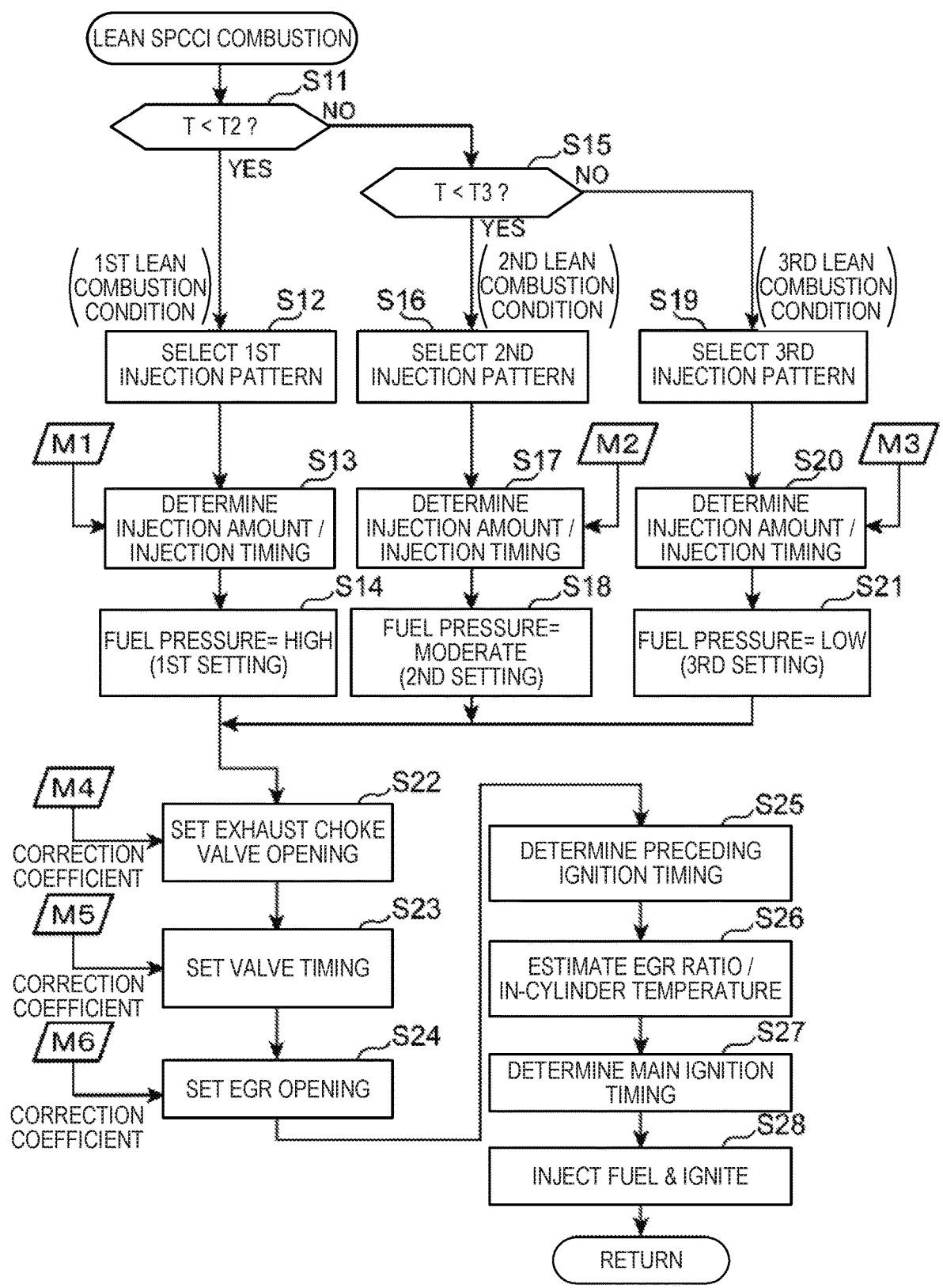
FIG. 8 is a subroutine illustrating a specific procedure of Step S3 in FIG. 7.

FIG. 8 illustrates a subroutine illustrating a specific procedure of the control illustrated at Step S3 (lean SPCCI combustion). As this control of the subroutine is started, the determining module 101 determines at Step S11 whether the engine water temperature T detected by the water temperature sensor SN2 is lower than a second threshold T2. The second threshold T2 is a temperature larger than the first threshold T1 (70° C.) described above by a given amount, and it is set to 80° C. in this embodiment.

If it is determined as YES at Step S11 and it is confirmed that the engine water temperature T is lower than the second threshold T2, the combustion controlling module 102 shifts to Step S12, where it selects a first injection pattern illustrated in Chart (a) of FIG. 9 as the injection pattern of fuel by the injector 15.

As illustrated in Chart (a) of FIG. 9, the first injection pattern is an injection pattern in which three fuel injections Fa1, Fa2, and Fa3 are performed during an intake stroke, and one fuel injection Fb is performed during the second half of a compression stroke. Below, "Fa1" is referred to as a first early injection, "Fa2" is referred to as a second early injection, "Fa3" is referred to as a third early injection, and "Fb" is referred to as a retarded injection. Moreover, the first to third early injections Fa1-Fa3 may be simply and comprehensively referred to as "the early injection Fa."

In the first injection pattern, the first early injection Fa1 is started in an early period of an intake stroke, the second early injection Fa2 is started in a middle period of the intake stroke, and the third early injection Fa3 is started in a late period of the intake stroke. Moreover, the retarded injection Fb is started in the second half of a compression stroke, in more detail, a late period of the compression stroke. In other words, when the first injection pattern is selected, the injector 15 performs the early injection Fa dividedly in 3 steps (Fa1, Fa2, and Fa3) during an intake stroke, and performs one retarded injection Fb in the second half of a compression stroke (in detail, the late period of the compression stroke).

Note that the terms "early period," "middle period," and "late period" (or "first half" and "second half") of a certain stroke as used herein refer to the followings. Herein, when an arbitrary stroke, such as an intake stroke or a compression stroke, is equally divided into two periods, the first period and the second period are defined as the "first half" and the "second half," respectively. Therefore, for example, (i) the first half and (ii) the second half of a compression stroke refer to ranges of (i) 180° C.A to 90° C.A before a compression top dead center (BTDC) and (ii) 90° C.A to 0° C.A BTDC, respectively. Similarly, when arbitrary stroke is equally divided into three, and the first period, the second period, and the third period are herein defined as the "early period," "middle period," and "late period," respectively. Therefore, for example, (iii) the early period, (iv) the middle period, and (v) the late period of an intake stroke refer to (iii) 360° C.A to 300° C.A BTDC, (iv) 300° C.A to 240° C.A BTDC, and (v) 240° C.A to 180° C.A BTDC, respectively.

Here, if the determination result at Step S11 is YES, this means that the engine is operated in the first operating range A1, and the engine water temperature T is the first threshold T1 or higher and is lower than the second threshold T2. In this embodiment, this condition is referred to as a "first lean combustion condition." The first lean combustion condition belongs to a category where the engine water temperature is low, among the conditions in which the lean SPCCI combustion can be performed. The first injection pattern (Chart (a) of FIG. 9) selected at Step S12 is an injection pattern suitable for the first lean combustion condition at the comparatively low temperature.

Next, the combustion controlling module 102 shifts to Step S13, where it determines the injection amount and the injection timing of each fuel injection in the first injection pattern (three early injections Fa1-Fa3 and one retarded injection Fb) based on the engine load (required torque) and the engine speed. A map M1 is referenced when determining the injection amount and the injection timing. The map M1 defines the injection amount and the injection timing of each of the injections Fa1-Fa3 and Fb in the first injection pattern for every condition of the engine speed and load, and is stored beforehand in the memory 103. The injection amount and the injection timing on this map M1 are defined in consideration of the target SI ratio and the target $\theta$ci described in (3-1). In other words, at Step S13, the injection amount and the injection timing of each of the injections Fa1-Fa3 and Fb in the first injection pattern are determined so that they become values suitable for achieving the target SI ratio and the target $\theta$ci.

Next, the combustion controlling module 102 shifts to Step S14, where it controls the fuel pressure regulator 17 so that the injection pressure by the injector 15 becomes a first setting which is comparatively high. For example, the first setting may be about 70 MPa.

Next, a control when it is determined as NO at Step S11, that is, when it is confirmed that the engine water temperature T is the second threshold T2 or higher is described. In this case, the determining module 101 shifts to Step S15, where it determines whether the engine water temperature T is lower than a third threshold T3. The third threshold T3 is a temperature larger than the second threshold T2 (80° C.) described above by a given amount, and in this embodiment, it is set to 100° C.

If it is determined as YES at Step S15 and it is confirmed that the engine water temperature T is the second threshold T2 or higher and lower than the third threshold T3, the combustion controlling module 102 shifts to Step S16, where it selects a second injection pattern illustrated in Chart (b) of FIG. 9 as the injection pattern of fuel by the injector 15.

As illustrated in Chart (b) of FIG. 9, the second injection pattern is an injection pattern in which three fuel injections comprised of the first early injection Fa1, the second early injection Fa2, and the third early injection Fa3 are performed during an intake stroke. Unlike the first injection pattern (Chart (a) of FIG. 9) described above, the retarded injection Fb is not performed.

The rough timings of the early injections Fa1-Fa3 in the second injection pattern are similar to those in the first injection pattern. That is, also in the second injection pattern, the first early injection Fa1 is started in the early period of an intake stroke, the second early injection Fa2 is started in the middle period of the intake stroke, and the third early injection Fa3 is started in the late period of the intake stroke. However, since the retarded injection Fb is prohibited, the injection amount of the first early injection Fa1 is increased by an amount corresponding to the retarded injection Fb.

Here, if the determination result at Step S15 is YES, this means that the engine is operated in the first operating range A1 and the engine water temperature T is the second threshold T2 or higher and lower than the third threshold T3. In this embodiment, this condition is referred to as a "second lean combustion condition." The second lean combustion condition belongs to a category where the engine water temperature is moderate, among the conditions where the lean SPCCI combustion can be performed. The second injection pattern (Chart (b) of FIG. 9) selected at Step S16 is an injection pattern suitable for the second lean combustion condition at the moderate temperature.

Next, the combustion controlling module 102 shifts to Step 17, where it determines the injection amount and the injection timing of each fuel injection in the second injection pattern (three early injections Fa1-Fa3) based on the engine load and the engine speed. A map M2 is referenced for determining the injection amount and the injection timing. The map M2 defines the injection amount and the injection timing of each of the injections Fa1-Fa3 in the second injection pattern for every condition of the engine speed and load, and is stored beforehand in the memory 103. The injection amount and the injection timing on this map M2 are defined in consideration of the target SI ratio and the target θci described above. In other words, at Step S17, the injection amount and the injection timing of each of the injections Fa1-Fa3 in the second injection pattern are determined so that they become values suitable for achieving the target SI ratio and the target θci.

Next, the combustion controlling module 102 shifts to Step S18, and it controls the fuel pressure regulator 17 so that the injection pressure by the injector 15 becomes a second setting at a moderate pressure. For example, the second setting may be about 40 MPa to 70 MPa.

Next, a control when it is determined as NO at Step S15, that is, when it is confirmed that the engine water temperature T is the third threshold T3 (100° C.) or higher is described. In this case, the determining module 101 shifts to Step S19, where it selects a third injection pattern illustrated in Chart (c) of FIG. 9 as the injection pattern of fuel by the injector 15.

As illustrated in Chart (c) of FIG. 9, the third injection pattern is an injection pattern in which the three fuel injections comprised of the first early injection Fa1, the second early injection Fa2, and the third early injection Fa3 are performed during an intake stroke, and is similar to the second injection pattern (Chart (b) of FIG. 9) described above. The first early injection Fa1 is started in the early period of the intake stroke, the second early injection Fa2 is started in the middle period of the intake stroke, and the third early injection Fa3 is started in the late period of the intake stroke. Note that compared with the second injection pattern, the start timing of the first early injection Fa1 which is the first fuel injection is made earlier, and the ratio of the injection amount of the first early injection Fa1 (divided ratio) is increased.

Here, if the determination result at Step S15 is NO, this means that the engine is operated in the first operating range A1 and the engine water temperature T is the third threshold T3 or higher. In this embodiment, this condition is referred to as a "third lean combustion condition." The third lean combustion condition belongs to a category where the engine water temperature is high, among the conditions where the lean SPCCI combustion can be performed. The third injection pattern selected at Step S19 is an injection pattern suitable for the third lean combustion condition at the comparatively high temperature.

Next, the combustion controlling module 102 shifts to Step S20, where it determines the injection amount and the injection timing of each of the fuel injection (three early injections Fa1-Fa3) in the third injection pattern based on the engine load and the engine speed. A map M3 is referenced for determining the injection amount and the injection timing. The map M3 defines the injection amount and the injection timing of each of the injections Fa1-Fa3 in the third injection pattern for every condition of the engine speed and load, and is stored beforehand in the memory 103. The injection amount and the injection timing on this map M3 are set in consideration of the target SI ratio and the target θci described above. In other words, at Step S20, the injection amount and the injection timing of each of the injections Fa1-Fa3 in the third injection pattern are determined so that they become values suitable for achieving the target SI ratio and the target θci.

Next, the combustion controlling module 102 shifts to Step S21, where it controls the fuel pressure regulator 17 so that the injection pressure by the injector 15 becomes a third setting at a comparatively low pressure. For example, the third setting may be about 40 MPa.

After such a setup of the injection pattern of fuel (the injection amount and the injection timing) and the injection pressure, the combustion controlling module 102 shifts to Step S22, where it determines the opening of the exhaust choke valve 42 based on the engine load, the engine speed, etc., and controls the exhaust choke valve 42 by using the determined opening as a target value. When determining the opening of the exhaust choke valve 42, a map M4 and a correction coefficient are used. The map M4 defines the opening of the exhaust choke valve 42 for every condition of the engine load and the engine speed, and the correction coefficient is a correction coefficient for correcting the opening of the exhaust choke valve 42 defined by the map M4, according to the engine water temperature, and the map M4 and the correction coefficient are stored beforehand in the memory 103. By using the map M4 and the correction coefficient, the opening of the exhaust choke valve 42 is set as a value suitable for achieving the target SI ratio and the target θci.

Next, the combustion controlling module 102 shifts to Step S23, where it determines the open and close timings (valve timings) of the intake and exhaust valves 11 and 12 based on the engine load, the engine speed, etc., and controls the intake and exhaust VVTs 13 and 14 by using the determined valve timings as a target value. When determining the valve timing, a map M5 and a correction coefficient are used. The map M5 defines the valve timing for every condition of the engine load and the engine speed, and the correction coefficient is a correction coefficient for correcting the valve timing defined by the map M5, according to the engine water temperature, and the map M5 and the correction coefficient are stored beforehand in the memory 103. By using the map M5 and the correction coefficient, the valve timing and the valve overlap period (FIG. 3) are set as values suitable for achieving the target SI ratio and the target θci.

Next, the combustion controlling module 102 shifts to Step S24, where it determines the opening of the EGR valve 53 (EGR opening) based on the engine load, the engine speed, etc., and controls the EGR valve 53 by using the determined EGR opening. When determining the EGR opening, a map M6 and a correction coefficient are used. The map M6 defines the EGR opening for every condition of the engine load and the engine speed, and the correction coefficient is a correction coefficient for correcting the EGR opening defined by the map M6, according to the engine water temperature, and the map M6 and the correction coefficient are stored beforehand in the memory 103. By using the map M6 and the correction coefficient, the EGR opening is set as a value suitable for achieving the target SI ratio and the target θci.

Next, the combustion controlling module 102 shifts to Step S25, where it determines the timing of the preceding ignition Sb. The timing of the preceding ignition Sb is determined based on the fuel injection timing determined at the previous step (any one of Steps S13, S17, and S20). For example, when the first or second lean combustion condition is satisfied and the first injection pattern (Chart (a) of FIG. 9) or the second injection pattern (Chart (b) of FIG. 9) is selected, a given crank angle timing which is located between the first early injection Fa1 and the second early injection Fa2 is determined as the timing of the preceding ignition Sb. Moreover, when the third lean combustion condition is satisfied and the third injection pattern (Chart (c) of FIG. 9) is selected, a timing at which a given crank angle passes from the end time of the third early injection Fa3 and which corresponds immediately before the main ignition Sa is determined as the timing of the preceding ignition Sb.

Here, the energy of the preceding ignition Sb is set to a comparatively low energy which does not cause the flame propagation of the mixture gas, in detail, the energy in which the mixture gas around sparks (arc) goes up to 850K or higher and 1140K or lower. This is to cleave the fuel component by the preceding ignition Sb to generate an intermediate product which is highly reactive, thereby speeding up the combustion rate of the mixture gas using the intermediate product. That is, when the temperature of the mixture gas is increased to such a temperature range, the fuel component (hydrocarbon) is cleaved to generate hydrogen peroxide ($H_2O_2$) and formaldehyde ($CH_2O$), and these components create OH radicals. Since OH radicals are strong in oxidization and highly reactive, the generation of the intermediate product containing such OH radical inside the combustion chamber 6 after the preceding ignition speeds up the combusting rate of the mixture gas, thereby improving thermal efficiency. On the other hand, even if the temperature of the mixture gas is increased to the temperature range by the preceding ignition Sb, a flame is not substantially formed in the mixture gas, and therefore, SI combustion does not start. Accordingly, the energy of the main ignition Sa is set sufficiently higher than the energy of the preceding ignition Sb to cause the mixture gas to perform the flame propagation.

Next, the combustion controlling module 102 shifts to Step S26, where it estimates an actual EGR rate inside the combustion chamber 6 and a temperature inside the combustion chamber 6 (in-cylinder temperature) near a compression top dead center (at or near the compression top dead center). As described above, in this embodiment, although the open and close timings of the intake and exhaust valves 11 and 12 (valve timings) and the opening of the EGR valve 53 (EGR valve opening) are defined on the maps, the EGR rate may vary due to various factors, such as a response delay, even if the valve timings and the EGR valve opening are controlled as the settings of the maps. Moreover, the variation in the EGR rate leads to a variation in the in-cylinder temperature near a compression top dead center, together with other factors, such as the ambient temperature. Therefore, the combustion controlling module 102 estimates the actual EGR rate inside the combustion chamber 6 (external EGR rate and internal EGR rate) at a close timing of the intake valve 11 (IVC timing) and the in-cylinder temperature near a compression top dead center immediately after the IVC, based on the detection values from the various sensors, such as the airflow sensor SN3, the intake air temperature sensor SN4, and the intake air pressure sensor SN5 (intake air flow rate, intake air temperature, intake pressure, etc.), the settings of the valve timings and the EGR valve opening, and the given model formula determined beforehand. The model formula is a model formula in which, for example, the latest histories of parameters, such as the intake air flow rate, the intake air temperature, the intake pressure, the valve timings, and the EGR valve opening, are used as input elements, and is set so as to estimate the actual external EGR rate and the actual internal EGR rate at the IVC timing which reflect the response delay, and the in-cylinder temperature near the compression top dead center.

Next, the combustion controlling module 102 shifts to Step S27, where it determines the timing of the main ignition Sa based on the EGR rate and the in-cylinder temperature estimated at Step S26. In detail, the combustion controlling module 102 determines, by using the model formula defined beforehand, the timing of the main ignition Sa so that the target SI ratio and the target θci described above are achieved. The model formula is a model formula which uses a plurality of parameters including the estimated EGR rate (the external EGR rate and the internal EGR rate) and the in-cylinder temperature as the input elements, and it is set to calculate the timing of the main ignition Sa so that the SI ratio and θci when the SPCCI combustion of the mixture gas is carried out matches with the target SI ratio and the target θci as much as possible. According to this model formula, the timing of the main ignition Sa is calculated to be at a more retarded side as a condition determined by a combination of the estimated EGR rate and in-cylinder temperature becomes easier to ignite the mixture gas, and conversely, it is calculated at a more advanced side as the condition becomes more difficult to ignite the mixture gas, within a given crank angle range near the compression top dead center.

Next, the combustion controlling module 102 shifts to Step S28, where it causes the injector 15 to inject fuel, and causes the ignition plug 16 to perform the preceding ignition Sb and the main ignition Sa. That is, the combustion controlling module 102 controls the injector 15 so that fuel is injected according to the fuel injection pattern determined at any one of Steps S12, S16, and S19, and the injection amount and the injection timing of the plurality of fuel injections (Fa1 to Fa3, etc.) included in the injection pattern matches with the injection amount and the injection timing determined at any one of Steps S13, S17, and S20. It also controls the ignition plug 16 so that the preceding ignition Sb is performed at the timing determined at Step S23, and the main ignition Sa is performed at the timing determined at Step S25.

Figure 10:
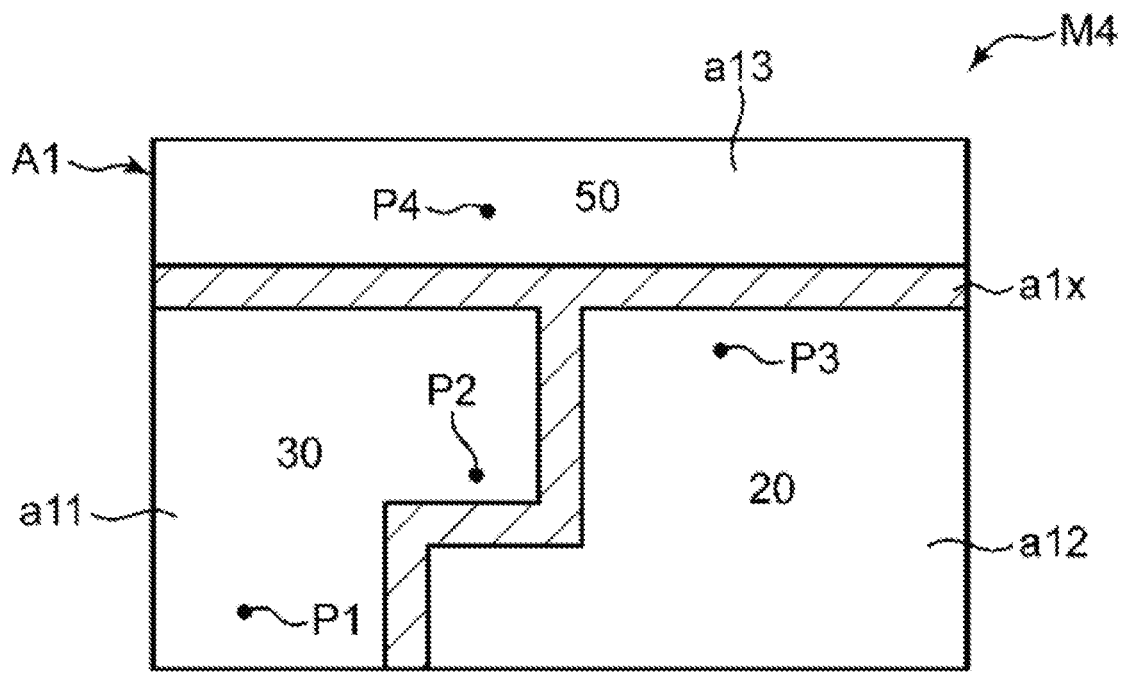
FIG. 10 is a view illustrating one example of a map used when determining an opening of an exhaust choke valve during operation in the first operating range.

FIG. 10 is a view illustrating one example of the map M4 used when determining the opening of the exhaust choke valve 42 at Step S22. In FIG. 10, a range surrounded by a rectangular outer contour indicates the first operating range A1, and numerical values therein indicate valve openings (%) of the exhaust choke valve 42. For example, in the map M4, the numerical values (map values) of "20," "30," and "50" given to three subdivided ranges a11, a12, and a13 (white parts with no hatching) divided by a hatched range a1x mean that the opening of the exhaust choke valve 42 is uniformly set to 20%, 30%, and 50% in the respective subdivided ranges a11, a12, and a13. On the other hand, in the hatched range a1x other than the subdivided ranges, the opening of the exhaust choke valve 42 is determined by a linear interpolation. For example, at a position of the hatched range a1x between the subdivided range a11 and the subdivided range a12, the opening of the exhaust choke valve 42 is set to a median of 20% and 30%.

According to FIG. 10, the map M4 is set so that the subdivided range a13 corresponding to the map value "50" is located at the highest load side, the subdivided range a11 corresponding to the map value "30" occupies a part at the low-speed side of the ranges other than the high-load range (subdivided range a13), and the subdivided range a12 corresponding to the map value "20" occupies a part on the high-speed side of the ranges other than the high-load range. That is, the opening of the exhaust choke valve 42 based on the map M4 is determined so that it becomes uniformly 30% in the subdivided range a11 at the low-speed side, becomes uniformly 20% in the subdivided range a12 on the high-speed side, and becomes uniformly 50% in the subdivided range a13 on the high-load side. In other words, the opening of the exhaust choke valve 42 in the first operating range A1 is set so as to become lower at the high-speed side (subdivided range a12) than the low-speed side (subdivided range a11), except for a part of the high-load side (subdivided range a13). Note that the subdivided range a12 on the high-speed side is an example of a "first high-speed subdivided range" in the present disclosure, and the subdivided range a11 at the low-speed side is an example of a "first low-speed subdivided range" in the present disclosure.

As illustrated at Step S22, upon the determination of the exhaust choke valve 42, the correction coefficient determined not only according to the map M4 in FIG. 10 but also according to the engine water temperature T is used. That is, a value obtained by multiplying a default value determined by the map M4 based on the condition of the engine load and the engine speed by the correction coefficient according to the engine water temperature T is determined as the final valve opening of the exhaust choke valve 42. Suppose the correction coefficient when the engine water temperature T is greater than or equal to the first threshold T1 and less than the second threshold T2 (i.e., when a first lean combustion condition is satisfied) is defined as a first correction coefficient, the correction coefficient when the engine water temperature T is greater than or equal to the second threshold T2 and less than the third threshold T3 (i.e., when a second lean combustion condition is satisfied) is defined as a second correction coefficient, the correction coefficient when the engine water temperature T is greater than or equal to the third threshold T3 (i.e., when a third lean combustion condition is satisfied) is defined as a third correction coefficient, the first correction coefficient is uniformly set as 1, the third correction coefficient is set as a value larger than 1, and the second correction coefficient is set as a median of the first and third correction coefficients and a value which increases in proportion to the engine water temperature T. The third correction coefficient is set as a value which raises the default map values (e.g., 20, 30, and 50) to 100. Note that since the first correction coefficient is 1, the map value defined in FIG. 10 is adopted as the opening of the exhaust choke valve 42 as it is within the temperature range from T1 to T2.

Figure 11:
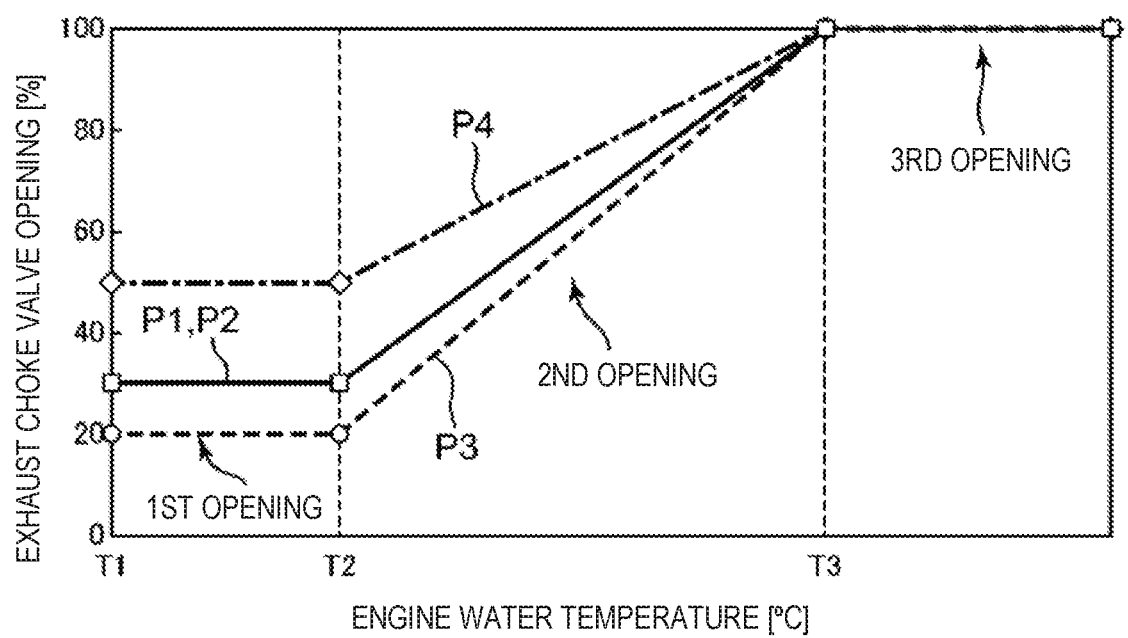
FIG. 11 is a graph illustrating a relationship between an engine water temperature and the opening of the exhaust choke valve.

By applying such correction coefficients, the opening of the exhaust choke valve 42 in the first operating range A1 changes with a tendency as illustrated in FIG. 11 according to the engine water temperature T. In the graph of FIG. 11, lines with characters P1-P4 indicate a relationship between the opening of the exhaust choke valve 42 at the respective operation points P1-P4 in FIG. 10 (map M4) and the engine water temperature T. Note that since the operation points P1 and P2 belong to the subdivided range a11 corresponding to the same map value (30), the valve openings of the exhaust choke valve 42 at both the points P1 and P2 are the same. This is why the openings of the exhaust choke valve 42 at the operation points P1 and P2 are illustrated by the same line.

As illustrated in FIG. 11, at any of the operation points P1-P4, the opening of the exhaust choke valve 42 is set as the lowest value within the temperature range from T1 to T2 (70° C. to 80° C.), set as 100% within the temperature range of T3 (100° C.) or higher, and set so as to increase in proportion to the engine water temperature T within the temperature range from T2 to T3 (80° C. to 100° C.).

In detail, at the operation point P1 where the load and the engine speed are the lowest in the first operating range A1, and at the operation point P2 where the load and the engine speed are the second lowest, the opening of the exhaust choke valve 42 is set to 30% within the temperature range from T1 to T2, 30% to 100% within the temperature range from T2 to T3, and 100% within the temperature range of T3 or higher. The opening of the exhaust choke valve 42 at the operation point P3 on the high-speed side is set to 20% within the temperature range from T1 to T2, 20% to 100% within the temperature range from T2 to T3, and 100% within the temperature range of T3 or higher. The opening of the exhaust choke valve 42 at the operation point P4 on the high-load side is set to 50% within the temperature range from T1 to T2, 50% to 100% within the temperature range from T2 to T3, and 100% within the temperature range of T3 or higher.

Here, for the setting values of the opening of the exhaust choke valve 42 at the operation points P1-P4, the opening at T1-T2 is defined as a first opening, the opening at T2-T3 as a second opening, and the opening at T3 or larger as a third opening. In other words using these terms, in this embodiment, the exhaust choke valve 42 is controlled so that the first opening and the third opening become constant regardless of the engine water temperature T, the third opening is larger than the first opening, and the second opening increases between the first opening and the third opening in proportion to the engine water temperature T.

Figure 12:
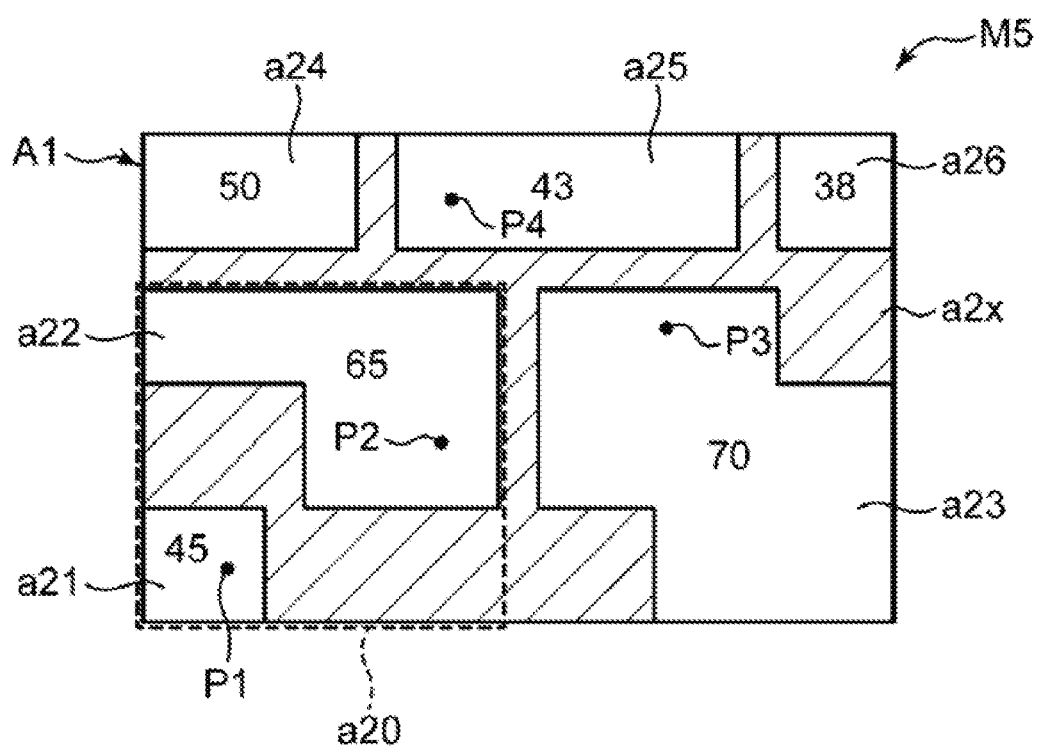
FIG. 12 is a view illustrating one example of a map used when determining a valve overlap period during the operation in the first operating range.

FIG. 12 is a view illustrating one specific example of a map M5 used when determining the open and close timings (valve timings) of the intake and exhaust valves 11 and 12 at Step S23. In FIG. 12, a range surrounded by a rectangular outer contour indicates the first operating range A1, and numerical values therein indicate valve overlap periods (° CA). For example, in the map M5, the numerical values (map values) of "45," "65," "70," "50," "43," and "38" given to the respective subdivided ranges a21, a22, a23, a24, a25, and a26 (white parts with no hatching) divided by a hatched range a2x mean that the valve overlap period is set uniformly as 45° C.A, 65° C.A, 70° C.A, 50° C.A, 43° C.A, and 38° C.A in the respective subdivided ranges a21, a22, a23, a24, a25, and a26. Note that in fact, although the map M5 defines the open timing and the close timing of the intake valve 11, and the open timing and the close timing of the exhaust valve 12, the valve overlap period is conveniently indicated as a value representing each of the timings in FIG. 12. The valve overlap period is determined by a linear interpolation in the hatched range a2x other than the subdivided ranges. For example, the valve overlap period is set as a median of 65° C.A and 70° C.A at a position of the hatched range a2x between the subdivided range a22 and the subdivided range a23.

According to FIG. 12, the map M5 is set so that the subdivided ranges a24, a25, and a26 respectively corresponding to the map values "50," "43," and "38" are located at the highest load side, the subdivided ranges a21 and a22 respectively corresponding to the map values "45" and "65" occupy a part at the low-speed side of a range other than the high-load range (the subdivided range a24, a25, a26), and the subdivided range a23 corresponding to the map value "70" occupies a high-speed side part of a range other than the high-load range. That is, the valve overlap period based on the map M5 is determined so as to be uniformly 45° C.A and 65° C.A in the subdivided ranges a21 and a22 at the low-speed side, respectively, uniformly 70° C.A in the subdivided range a23 on the high-speed side, and uniformly 50° C.A, 43° C.A, and 38° C.A in the subdivided ranges a24, a25, and a26 on the high-load side. Here, suppose a range of a broken line which includes the subdivided ranges a21 and a22 and does not overlap with other subdivided ranges is a subdivided range a20. The valve overlap period in the subdivided range a20 is longer than or equal to 45° C.A and shorter than or equal to 65° C.A, and is shorter than the valve overlap period in the subdivided range a23 on the high-speed side (70° C.A). In other words, the valve overlap period in the first operating range A1 is set so as to be longer at the high-speed side (subdivided range a23) than the low-speed side (subdivided range a20), except for the high-load side part. Note that the subdivided range a23 on the high-speed side is an example of a "second high-speed subdivided range" in the present disclosure, and the subdivided range a20 at the low-speed side is an example of a "second low-speed subdivided range" in the present disclosure.

As described at Step S23, upon the determination of the valve overlap period, a correction coefficient determined not only according to the map M5 of FIG. 12 but also according to the engine water temperature T is used. That is, a value obtained by multiplying the default value determined by the map M5 based on the condition of the engine load and the engine speed by the correction coefficient according to the engine water temperature T is determined as a final valve overlap period. The tendency of this correction coefficient is similar to the tendency of the correction coefficient for the exhaust choke valve 42 described above, in the sense that the value becomes 1 within the temperature range from T1 to T2, becomes larger than 1 within the temperature range T3 or higher, and becomes the median within the temperature range from T2 to T3. Note that, here, the correction coefficient (correction coefficient for the valve overlap period) for the default value (70) defined in the subdivided range a23 on the high-speed side is always set as 1. This is because 70° C.A is a limit of the valve overlap period in terms of the mechanism of the intake and exhaust VVTs 13 and 14.

Figure 13:
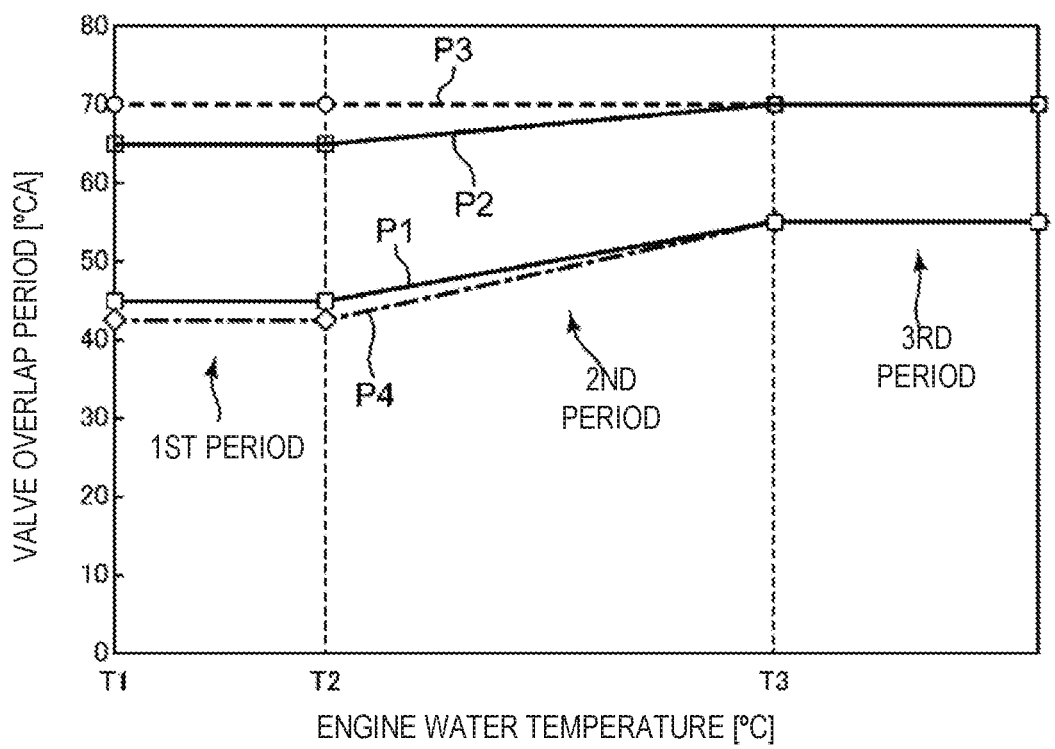
FIG. 13 is a graph illustrating a relationship between the engine water temperature and the valve overlap period.

By applying such a correction coefficient, the valve overlap period in the first operating range A1 changes with a tendency as illustrated in FIG. 13 according to the engine water temperature TA. In the graph of FIG. 13, lines with characters P1-P4 indicate a relation of the valve overlap period at the respective operation points P1-P4 in FIG. 12 (map M5) and the engine water temperature T. As illustrated in FIG. 13, at the three operation points P1, P2, and P4 excluding the operation point P3, the valve overlap period is set as the lowest value within the temperature range from T1 to T2 (70° C. to 80° C.), as the highest value within the temperature range of T3 or higher (100° C.), and is set so as to increase in proportion to the engine water temperature T within the temperature range from T2 to T3 (80° C. to 100° C.).

Specifically, the valve overlap period at the operation point P1 where the load and the engine speed are the lowest in the first operating range A1 is set as 45° within the temperature range from T1 to T2, 45° C.A to 55° C.A within the temperature range from T2 to T3, and 55° C.A within the temperature range of T3 or higher. The valve overlap period at the operation point P2 where the load and the engine speed are the second lowest is set as 65° C.A within the temperature range from T1 to T2, 65° C.A to 70° C.A within the temperature range from T2 to T3, and 70° C.A within the temperature range T3 or higher. The valve overlap period at the high operation point P4 where the load is the highest is set as 43° C.A within the temperature range from T1 to T2, 43° C.A to 55° C.A within the temperature range from T2 to T3, and 55° C.A within the temperature range T3 or higher. On the other hand, the valve overlap period at the operation point P3 on the high-speed side is set uniformly as 70° C.A regardless of the engine water temperature T.

Here, regarding the setting values of the valve overlap period at the three operation points P1, P2, and P4 excluding the operation point P3, the overlap period at T1-T2 is defined as a first period, the overlap period at T2-T3 is defined as a second period, and the overlap period at T3 or higher is defined as a third period. In other words using these terms, in this embodiment, the intake and exhaust VVTs 13 and 14 are controlled so that the first period and the third period are constant regardless of the engine water temperature T, the third period becomes longer than the first period, and the second period becomes longer in proportion to the engine water temperature T between the first period and the third period.

(5) Operation and Effects

As described above, in this embodiment, when the engine is operated in the first operating range A1 where the engine load is low, the intake and exhaust VVTs 13 and 14 are controlled so that the valve overlap period with a given amount or more (the map value in FIG. 12 or larger) is formed, and the injector 15 and the ignition plug 16, etc. are controlled so that SPCCI combustion of mixture gas is carried out under the A/F lean environment where the air-fuel ratio inside the combustion chamber 6 becomes larger than a stoichiometric air fuel ratio. Moreover, the opening of the exhaust choke valve 42 in the first operating range A1 is adjusted so as to be smaller when the engine water temperature T is low than that when the engine water temperature T is high. In more detail, when changing the engine water temperature T while fixing the condition of the engine load and the engine speed, the opening of the exhaust choke valve 42 is adjusted so as to become the lowest value within the temperature range of the first threshold T1 or higher and lower than the second threshold T2 (70° C. to 80° C.), increase in proportion to the engine water temperature T within the temperature range of the second threshold T2 or higher and lower than the third threshold T3 (80° C. to 100° C.), and become the highest value (100%) within the temperature range of the third threshold or higher (100° C. or above). According to such a configuration, there is an advantage that both the improvement in fuel efficiency and securing combustion stability can be achieved by making the air-fuel ratio leaner.

That is, in the embodiment, when the A/F lean SPCCI combustion is performed in the situation where the engine water temperature T is relatively low and the engine load is low, since the control is executed in which the opening of the exhaust choke valve 42 is reduced while forming the valve overlap period of the given amount or more, the rate of internal EGR gas (internal EGR rate) which is exhaust gas drawn back to the combustion chamber 6 from the exhaust port 10 during the valve overlap period can be fully increased because the exhaust circulation resistance is increased due to the reduction in the opening of the exhaust choke valve 42. Therefore, since the temperature inside the combustion chamber 6 before mixture gas ignites (in-cylinder temperature) increases, the A/F lean environment where the engine water temperature T is low and the mixture gas is easy to ignite can be created inside the combustion chamber 6, thereby improving combustion stability of the mixture gas. Since the reduction in the opening of the exhaust choke valve 42 leads to an increase in the exhaust circulation resistance (as a result, an increase in the pumping loss), it is originally disadvantageous in respect of fuel efficiency. However, the combination of the improvement in combustion stability by increasing the internal EGR rate with the effect of making the air-fuel ratio leaner (the drop of the combustion temperature, and the reduction of the pumping loss) can acquire enough effect of the efficiency improvement, even if the degradation in fuel efficiency due to the increase in the exhaust circulation resistance is deducted. Therefore, for example, compared with the case where SPCCI combustion of mixture gas is carried out under the stoichiometric environment where the air-fuel ratio inside the combustion chamber 6 is near a stoichiometric air fuel ratio, fuel efficiency can be improved substantially. In other words, the first threshold T1 (in this embodiment, 70° C.) which is the lower-limit temperature above which the A/F lean SPCCI combustion is permitted in the first operating range A1 is set as the temperature at which the substantial fuel efficiency improvement effect can be acquired, even if the negative nature due to the reduction in the opening of the exhaust choke valve 42 is deducted.

On the other hand, when the A/F lean SPCCI combustion is performed in the situation where the engine water temperature T is relatively high and the engine load is low, since the opening of the exhaust choke valve 42 is increased, the exhaust passage 40 can avoid being unnecessarily choked under the situation where the engine water temperature T is high and the ignitability of the mixture gas is improved, thereby reducing the exhaust circulation resistance, while ensuring combustion stability. Therefore, since the pumping loss when the warm-up progresses is fully reduced, fuel efficiency can be improved more effectively.

Especially, in this embodiment, since the opening of the exhaust choke valve 42 is made the lowest when the engine water temperature T is greater than or equal to the first threshold T1 and less than the second threshold T2, and is gradually increased as the engine water temperature T goes up greater than or within the range of the second threshold T2 and less than the third threshold T3, and is made the highest when the engine water temperature T is greater than or equal to the third threshold T3, the amount of internal EGR gas can be adjusted appropriately according to the engine water temperature T (a degree of progress of the warm-up) which influences the ignitability of the mixture gas. That is, by such an opening setup of the exhaust choke valve 42, the internal EGR rate can be made the highest under the low-temperature condition where the ignitability declines, the internal EGR rate can be gradually decreased according to the improvement in the ignitability due to the temperature increase, and the internal EGR rate can be made the lowest under the high-temperature condition where the ignitability is appropriate. Therefore, since the suitable amount of internal EGR gas which suits the temperature condition (ignitability) is introduced into the combustion chamber 6, combustion stability can be secured appropriately in the broad temperature range. Moreover, since the opening of the exhaust choke valve 42 is increased as the engine water temperature T becomes higher (as the ignitability becomes better), fuel efficiency can be improved, while reducing the exhaust circulation resistance (pumping loss) as much as possible.

Moreover, in this embodiment, as illustrated in FIG. 10, excluding the high-load side part of the first operating range A1 where it is considered that the ignitability becomes comparatively appropriate, since the opening of the exhaust choke valve 42 is changed according to the engine speed, that is, since the opening of the exhaust choke valve 42 is made smaller at the high-speed side in the first operating range A1 (subdivided range a12) than the low-speed side in the first operating range A1 (subdivided range a11), combustion stability can be improved, while securing the sufficient internal EGR rate, regardless of the engine speed. For example, in the high-speed side in the first operating range A1 where the advancing speed of the crank angle per unit time is fast, since the actual time corresponding to the valve overlap period becomes shorter, the sufficient internal EGR rate cannot be obtained at the high-speed side in the first operating range A1 if the opening of the exhaust choke valve 42 is constant regardless of the engine speed, and combustion stability may not be significantly improved. On the other hand, in this embodiment, since the opening of the exhaust choke valve 42 is made relatively smaller at the high-speed side in the first operating range A1 (subdivided range a12), the sufficient internal EGR gas can be secured also under the condition where the actual time corresponding to the valve overlap period is short, and the above situation such that combustion stability at the high-speed side declining can be avoided.

Moreover, in this embodiment, as illustrated in FIG. 12, excluding the high-load side part of the first operating range A1, since the valve overlap period is changed according to the engine speed, that is, since the valve overlap period at the high-speed side in the first operating range A1 (subdivided range a23) is made longer than the valve overlap period at the low-speed side in the first operating range A1 (subdivided range a20), by expanding the valve overlap period at the high-speed side where it is disadvantageous for securing the internal EGR rate, combustion stability can be improved, while ensuring the sufficient internal EGR rate, regardless of the engine speed.

Moreover, in this embodiment, when the engine is operated in the first operating range A1 and the engine water temperature T is the first threshold T1 or higher and lower than the second threshold T2 (70° C. to 80° C.), since the retarded injection Fb in the second half of a compression stroke is performed in addition to the early injection Fa in an intake stroke, the stratified mixture gas can be formed inside the combustion chamber 6 so that the mixture gas around the ignition plug 16 becomes relatively rich, thereby stimulating the generation of the flame propagation accompanying a jump-spark ignition of the ignition plug 16 (SI combustion) to stabilize the SPCCI combustion. Since this further improves combustion stability under the comparatively low temperature environment where the temperature is the first threshold T1 or higher and lower than the second threshold T2, in addition to the effect caused by the reduction in the opening of the exhaust choke valve 42 described above (and the increase in the internal EGR rate whereby), both the improvement in fuel efficiency and securing combustion stability can be achieved by making the air-fuel ratio leaner.

Moreover, in this embodiment, since the preceding ignition Sb which generates sparks of low energy at which the flame does not occur is performed before the main ignition Sa during the operation in the first operating range A1, the fuel can be modified by the preceding ignition Sb to generate inside the combustion chamber 6 the intermediate product which is highly reactive and contains OH radicals. Therefore, since the ignitability improves and the combustion rate of the mixture gas speeds up, fuel efficiency and combustion stability can be further improved.

Note that in this embodiment, the timing of the preceding ignition Sb is set in an intake stroke (here, between the first early injection Fa1 and the second early injection Fa2) when the engine water temperature T is greater than or equal to the first threshold T1 and less than the third threshold T3 (70° C. to 100° C.), and the timing of the preceding ignition Sb is largely retarded to the timing immediately before the main ignition Sa (in the second half of a compression stroke) when the engine water temperature T increases to the third threshold T (100° C.) or higher (Chart (c) of FIG. 9). This is because the appropriate combustion stability is easy to be secured if the engine water temperature T goes up to the third threshold T3 or higher, and therefore, the necessity of modifying the fuel is low. Rather, within the temperature range of the third threshold T3 or higher, by significantly shortening the period from the preceding ignition Sb to the main ignition Sa, the effect as if the occurring period of sparks is extended can be acquired, and as a result, the sufficient combustion stability can be secured even if the modification effect of fuel is less.

(6) Modifications

In the above embodiment, the opening of the exhaust choke valve 42 in the first operating range A1 is set as the lowest value greater than or within the temperature range of the first threshold T1 and less than the second threshold T2 (70° C. to 80° C.), set so as to increase in proportion to the engine water temperature T greater than or within the temperature range of the second threshold T2 and less than the third threshold T3 (80° C. to 100° C.), and set as the highest value (100%) greater than or within the temperature range of the third threshold (100° C. or above). The opening of the exhaust choke valve 42 may be increased in direct proportion to the engine water temperature T as the engine water temperature T increases from the first threshold T1, or may be increased in a plurality of steps according to the increase in the engine water temperature T.

In the above embodiment, greater than or within the temperature range of the first threshold T1 and less than the second threshold T2 (70° C. to 80° C.) where the opening of the exhaust choke valve 42 is set as the lowest value, the retarded injection Fb in which fuel is injected in the second half of a compression stroke is performed, and the retarded injection Fb is suspended when the engine water temperature T becomes greater than or equal to the second threshold T2 (80° C.). The retarded injection Fb may be continued until the engine water temperature T reaches a temperature higher than the second threshold T2 (e.g., about 90° C.). Alternatively, within the temperature range where the retarded injection Fb is performed, the injection amount of the retarded injection Fb may be reduced as the engine water temperature T increases.

Although in the above embodiment the early injection Fa (the first to third early injections Fa1-Fa3) during an intake stroke and the retarded injection Fb in the second half of a compression stroke are performed greater than or within the temperature range of the first threshold T1 and less than the second threshold T2 (70° C. to 80° C.), other fuel injections may be performed between the early injection Fa and the retarded injection Fb (e.g., the first half of the compression stroke). Similarly, fuel injections other than the early injection Fa may be performed in the first half of the compression stroke also when the second lean combustion condition and the third lean combustion condition are satisfied.

Although, in the above embodiment, the early injection Fa is performed dividedly in 3 steps, i.e., the three fuel injections comprised of the first to third early injections Fa1-Fa3 are performed as the early injection Fa, the number of early injections Fa is not limited to 3, and it may be 1 or 2, or may be 4 or more.

Although in this embodiment the opening of the exhaust choke valve 42, the valve overlap period, etc. are determined based on the engine load and the engine speed, and the engine water temperature (engine coolant temperature) detected by the water temperature sensor SN2, the temperature parameter used as a reference of the determination may be a parameter which changes according to the degree of progress of the engine warm-up, and for example, the temperature of engine oil (oil temperature) may be used as the reference of the judgment.

Although in the above embodiment the example in which the present disclosure is applied to the engine capable of performing the partial compression ignition combustion (SPCCI combustion) in which a portion of the mixture gas combusts by flame propagation from an ignition point of the ignition plug 16 (SI combustion) and the remaining mixture gas combusts by the self-ignition (CI combustion) is described, the present disclosure may be applied to an engine in which premixed compression ignition combustion (HCCI combustion) of at least the portion of the mixture gas is carried out. For example, the present disclosure is also applicable to an engine in which premixed compression ignition combustion of all the mixture gas inside the combustion chamber is carried out (an engine which does not need the jump-spark ignition by the ignition plug).

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

6 Combustion Chamber
13 Intake VVT (Variable Valve Mechanism)
14 Exhaust VVT (Variable Valve Mechanism)
15 Injector
16 Ignition Plug
32 Throttle Valve (Air Amount Adjusting Mechanism)
42 Exhaust Choke Valve
102 Combustion Controlling Module
A1 First Operating Range (Low-load Range)
Fa (Fa1-Fa3) Early Injection
Fb Retarded Injection
Sa Main Ignition
Sb Preceding Ignition
SN2 Water Temperature Sensor
T1 First Threshold
T2 Second Threshold
T3 Third Threshold
a11 Subdivided Range (First Low-speed Subdivided Range)
a12 Subdivided Range (First High-speed Subdivided Range)
a20 Subdivided Range (Second Low-speed Subdivided Range)
a23 Subdivided Range (Second High-speed Subdivided Range)

What is claimed is:

1. A control device for a premixed compression ignition engine including a combustion chamber, an injector configured to inject fuel into the combustion chamber, an intake valve configured to open and close an intake port configured to introduce intake air into the combustion chamber, an exhaust valve configured to open and close an exhaust port configured to discharge exhaust gas from the combustion chamber, an intake passage connected to the intake port, and an exhaust passage connected to the exhaust port, the control device comprising:
   an air amount adjusting mechanism, including at least a throttle valve, configured to adjust an amount of air introducing into the combustion chamber;
   a variable valve mechanism configured to change a valve overlap period when an open period of the intake valve and an open period of the exhaust valve overlap with each other;
   an exhaust choke valve provided to the exhaust passage so as to open and close the exhaust passage;
   a water temperature sensor configured to acquire a given temperature parameter that increases as a warm-up of the engine progresses, wherein the given temperature parameter is an engine coolant temperature; and
   a processor configured to execute a combustion controlling module to control the variable valve mechanism so that the valve overlap period of a given amount or more is formed in a low-load range where an engine load is low, and control the injector, the air amount adjusting mechanism, and the exhaust choke valve so that an air-fuel ratio (A/F) lean mixture gas having an air-fuel ratio greater than a stoichiometric air fuel ratio is formed inside the combustion chamber, and premixed compression ignition combustion of the mixture gas is carried out,
   wherein during an operation in the low-load range, the combustion controlling module adjusts an opening of the exhaust choke valve based on the engine coolant temperature acquired by the water temperature sensor is low, wherein the combustion controlling module controls the opening of the exhaust choke valve to increase as the engine coolant temperature increases when the engine coolant temperature is below a given value, and controls the opening of the exhaust choke valve to become fully opened when the engine coolant temperature is greater than or equal to the given value.

2. The control device of claim 1, wherein during the operation in the low-load range, the combustion controlling module makes the opening of the exhaust choke valve smaller as the engine coolant temperature decreases.

3. A control device for a premixed compression ignition engine including a combustion chamber, an injector configured to inject fuel into the combustion chamber, an intake valve configured to open and close an intake port configured to introduce intake air into the combustion chamber, an exhaust valve configured to open and close an exhaust port configured to discharge exhaust gas from the combustion chamber, an intake passage connected to the intake port, and an exhaust passage connected to the exhaust port, the control device comprising:
   an air amount adjusting mechanism, including at least a throttle valve, configured to adjust an amount of air introducing into the combustion chamber;
   a variable valve mechanism configured to change a valve overlap period when an open period of the intake valve and an open period of the exhaust valve overlap with each other;
   an exhaust choke valve provided to the exhaust passage so as to open and close the exhaust passage;
   a water temperature sensor configured to acquire a given temperature parameter that increases as a warm-up of the engine progresses; and
   a processor configured to execute a combustion controlling module to control the variable valve mechanism so that the valve overlap period of a given amount or more is formed in a low-load range where an engine load is low, and control the injector, the air amount adjusting mechanism, and the exhaust choke valve so that an air-fuel ratio (A/F) lean mixture gas having an air-fuel ratio greater than a stoichiometric air-fuel ratio is formed inside the combustion chamber, and premixed compression ignition combustion of the mixture gas is carried out,
   wherein during an operation in the low-load range, the combustion controlling module adjusts an opening of the exhaust choke valve based on the temperature parameter, wherein the combustion controlling module controls the opening of the exhaust choke valve to increase as the temperature parameter increases when the temperature parameter is below a given value, and controls the opening of the exhaust choke valve to become fully opened when the temperature parameter is greater than or equal to the given value,
   wherein during the operation in the low-load range, the combustion controlling module makes the opening of the exhaust choke valve smaller as the temperature parameter decreases, and
   wherein when the opening of the exhaust choke valve when the temperature parameter during the operation in the low-load range is greater than or equal to a first threshold and less than a second threshold is a first opening, the opening of the exhaust choke valve when the temperature parameter is greater than or equal to the second threshold and less than a third threshold is a second opening, and the opening of the exhaust choke valve when the temperature parameter is greater than or equal to the third threshold is a third opening, the combustion controlling module controls the exhaust choke valve so that the first opening and the third opening are constant regardless of the temperature parameter, the third opening is larger than the first opening, and the second opening increases in proportion to the temperature parameter between the first opening and the third opening.

4. The control device of claim 1,
wherein a low-speed side part of the low-load range is a first low-speed subdivided range, and a part of the low-load range that is at a higher speed side than the first low-speed subdivided range is a first high-speed subdivided range, and
under a condition where the engine coolant temperature is constant, the combustion controlling module makes the opening of the exhaust choke valve in the first high-speed subdivided range smaller than the opening of the exhaust choke valve in the first low-speed subdivided range.

5. The control device of claim 1, wherein when a low-speed side part of the low-load range is a second low-speed subdivided range, and a part of the low-load range that is at a higher speed side than the second low-speed subdivided range is a second high-speed subdivided range, under a condition where the engine coolant temperature is constant, the combustion controlling module controls the variable valve mechanism so that the valve overlap period in the second high-speed subdivided range becomes longer than the valve overlap period in the second low-speed subdivided range.

6. The control device of claim 1,
wherein the engine is provided with an ignition plug configured to ignite the mixture gas inside the combustion chamber, and
wherein the combustion controlling module causes the ignition plug to perform jump-spark ignition at a given timing near a compression top dead center so that, during the operation in the low-load range, partial compression ignition combustion in which a portion of the mixture gas combusts by flame propagation from an ignition point of the ignition plug, and the remaining mixture gas combusts by a self-ignition is performed.

7. The control device of claim 6, wherein when the engine is operated in the low-load range and the engine coolant temperature is below the given value, the combustion controlling module causes the injector to perform an early injection in which fuel is injected in an intake stroke, and a retarded injection in which fuel is injected in a second half of a compression stroke, and when the engine is operated in the low-load range and the engine coolant temperature is greater than or equal to the given value, the combustion controlling module controls the injector so that an injection amount ratio of the early injection increases and an injection amount ratio of the retarded injection decreases, compared with the case when the engine coolant temperature is less than the given value.

8. The control device of claim 3,
wherein a low-speed side part of the low-load range is a first low-speed subdivided range, and a part of the low-load range that is at a higher speed side than the first low-speed subdivided range is a first high-speed subdivided range, and
under a condition where the temperature parameter is constant, the combustion controlling module makes the opening of the exhaust choke valve in the first high-speed subdivided range smaller than the opening of the exhaust choke valve in the first low-speed subdivided range.

9. The control device of claim 3, wherein when a low-speed side part of the low-load range is a second low-speed subdivided range, and a part of the low-load range that is at a higher speed side than the second low-speed subdivided range is a second high-speed subdivided range, under a condition where the temperature parameter is constant, the combustion controlling module controls the variable valve mechanism so that the valve overlap period in the second high-speed subdivided range becomes longer than the valve overlap period in the second low-speed subdivided range.

10. The control device of claim 3,
wherein the engine is provided with an ignition plug configured to ignite the mixture gas inside the combustion chamber, and
wherein the combustion controlling module causes the ignition plug to perform jump-spark ignition at a given timing near a compression top dead center so that, during the operation in the low-load range, partial compression ignition combustion in which a portion of the mixture gas combusts by flame propagation from an ignition point of the ignition plug, and the remaining mixture gas combusts by a self-ignition is performed.

11. The control device of claim 10, wherein when the engine is operated in the low-load range and the temperature parameter is below the given value, the combustion controlling module causes the injector to perform an early injection in which fuel is injected in an intake stroke, and a retarded injection in which fuel is injected in a second half of a compression stroke, and when the engine is operated in the low-load range and the temperature parameter is greater than or equal to the given value, the combustion controlling module controls the injector so that an injection amount ratio of the early injection increases and an injection amount ratio of the retarded injection decreases, compared with the case when the temperature parameter is less than the given value.

* * * * *